United States Patent
Ma et al.

(10) Patent No.: US 11,171,350 B2
(45) Date of Patent: Nov. 9, 2021

(54) FLOW BATTERY CONTROL METHOD, FLOW BATTERY CONTROL SYSTEM AND FLOW BATTERY

(71) Applicant: DALIAN RONGKEPOWER CO., LTD, Liaoning (CN)

(72) Inventors: Xiangkun Ma, Liaoning (CN); Huamin Zhang, Liaoning (CN); Ting Chigan, Liaoning (CN); Xinliang Gao, Liaoning (CN); Hongbo Wang, Liaoning (CN); Yang Huo, Liaoning (CN)

(73) Assignee: DALIAN RONGKEPOWER CO., LTD, Liaoning (CN)

( * ) Notice: Subject to any disclaimer, the term of this patent is extended or adjusted under 35 U.S.C. 154(b) by 377 days.

(21) Appl. No.: 16/085,102

(22) PCT Filed: Mar. 14, 2016

(86) PCT No.: PCT/CN2016/076289
§ 371 (c)(1),
(2) Date: Jan. 9, 2019

(87) PCT Pub. No.: WO2017/156679
PCT Pub. Date: Sep. 21, 2017

(65) Prior Publication Data
US 2019/0123369 A1   Apr. 25, 2019

(51) Int. Cl.
*H01M 8/04858* (2016.01)
*H01M 8/04537* (2016.01)
(Continued)

(52) U.S. Cl.
CPC ..... *H01M 8/04895* (2013.01); *H01M 8/0444* (2013.01); *H01M 8/04365* (2013.01);
(Continued)

(58) Field of Classification Search
CPC .......... H01M 8/0495; H01M 8/04537; H01M 8/0444; H01M 8/04365; H01M 8/04611; H01M 8/04664; H01M 8/188; Y02E 60/50
See application file for complete search history.

(56) References Cited

U.S. PATENT DOCUMENTS

2008/0292964 A1* 11/2008 Kazacos ............. H01M 8/1088
429/231.5
2013/0084482 A1   4/2013 Chang et al.
(Continued)

FOREIGN PATENT DOCUMENTS

CN        103000927 A    3/2013
CN        103367785 A    10/2013
(Continued)

*Primary Examiner* — Matthew T Martin
(74) *Attorney, Agent, or Firm* — Novick, Kim & Lee, PLLC; Allen Xue

(57) ABSTRACT

The control method for a flow battery includes acquiring a current electrolyte capacity decay rate of the flow battery; comparing the current electrolyte capacity decay rate with a first preset decay rate and a second preset decay rate; when the current electrolyte capacity decay rate is greater than the first preset decay rate and less than the second preset decay rate, adjusting a liquid level of positive electrolyte and a liquid level of negative electrolyte, such that a difference between these two liquid levels is less than a preset value, a ratio of the total amount of vanadium in the positive electrolyte to the total amount of vanadium in the negative electrolyte remains in a first preset ratio range, or a ratio of a vanadium ion concentration in the positive electrolyte to a vanadium ion concentration in the negative electrolyte remains in a second preset ratio range.

11 Claims, 15 Drawing Sheets

(51) Int. Cl.
*H01M 8/0444* (2016.01)
*H01M 8/0432* (2016.01)
*H01M 8/04664* (2016.01)
*H01M 8/18* (2006.01)

(52) U.S. Cl.
CPC ... *H01M 8/04537* (2013.01); *H01M 8/04611* (2013.01); *H01M 8/04664* (2013.01); *H01M 8/188* (2013.01)

(56) References Cited

U.S. PATENT DOCUMENTS

2015/0017556 A1\* 1/2015 Kim .................. H01M 8/188
　　　　　　　　　　　　　　　　　　　　 429/409
2017/0033391 A1\* 2/2017 Kumamoto .......... H01M 8/188

FOREIGN PATENT DOCUMENTS

| CN | 104201407 A | 12/2014 |
| CN | 104518228 A | 4/2015 |

\* cited by examiner

FLOW BATTERY CONTROL METHOD, FLOW BATTERY CONTROL SYSTEM AND FLOW BATTERY

TECHNICAL FIELD

The present disclosure belongs to the technical field of flow batteries, and more particularly relates to a flow battery control method, a flow battery control system and a flow battery.

BACKGROUND ART

A flow battery is one of the preferred technologies for large-scale energy storage applications. As shown in FIG. 18, The flow battery in the prior art generally comprises an cell stack 6 composed of battery cells or formed by connecting a plurality of battery cells in series, a positive electrolyte storage tank 3, a negative electrolyte storage tank 4, a circulation pump 5 and liquid delivery pipelines 1, wherein each battery cell comprises a positive electrode, a negative electrode, positive electrolyte and negative electrolyte; the positive electrolyte storage tank 3 is connected with a positive electrolyte inlet 63 of the cell stack 6 through the circulation pump 5 via the liquid delivery pipeline 1; a positive electrolyte outlet 61 of the cell stack 6 is connected with the positive electrolyte storage tank 3 via the liquid delivery pipeline 1; the negative electrolyte storage tank 4 is connected with a negative electrolyte inlet 64 of the cell stack 6 through the circulation pump 5 via the liquid delivery pipeline 1; a negative electrolyte outlet 62 of the cell stack 6 is connected with the negative electrolyte storage tank 4 via the liquid delivery pipeline 1; an electric valve 2 is provided on each liquid delivery pipeline 1.

This flow battery in the prior art has the following problems:

1. During the charging and discharging cycle of the flow battery, the migration of ions and water between the positive and negative electrodes may cause the electrolyte to gradually become unbalanced, resulting in a decrease in battery efficiency and capacity. In the prior art, with respect to the detection means for the capacity decay degree of the flow battery, the vanadium ion concentration state of the electrolyte is obtained generally by pausing the operation of the flow battery and then sampling the electrolyte, thereby acquiring the capacity decay degree of the flow battery. Further, for the capacity control scheme of the flow battery after the capacity decay degree appears, there are a batch liquid adjustment method, an overflow method, and a positive and negative electrolyte storage tank communication method, wherein the batch liquid adjustment method and the overflow method require additional electric energy and/or equipment to redistribute the mixed electrolyte; the positive and negative electrolyte storage tank communication method can maintain the liquid surface leveled for a long time, so that the capacity of the flow battery is kept stable for a long time. However, it is found upon studies that long-term maintenance of the conduction of the positive and negative electrodes will cause electric leakage and reduce system efficiency. In addition, after different operation times, in order to obtain optimal performance and capacity stability of the flow battery, the difference between the liquid surfaces of the positive electrolyte and the negative electrolyte is varied. As can be seen from the above content, online monitoring and control of the capacity decay degree cannot be achieved, which affects the system operation efficiency. At the same time, different control methods are adopted for different capacity decay degrees, but there is no effective solution in the prior art.

2. There are many operating state parameters of the flow battery. Since the demands of different electrolyte temperatures, SOCs, capacity decay rates, and charge and discharge powers on reactants of the electrolyte are different, a difference between the volumes of positive electrolyte and negative electrolyte is configured according to different operating state parameters of the flow battery, and corresponding electrolyte flow rates are controlled, such that continuous operation of the flow battery under an optimal condition can be ensured, the flow rate requirements of the flow battery can be satisfied, and the power consumption of the circulation pump can be reduced. With respect to this case, there is no effective technical solution in the prior art.

3. When the flow battery operates and works, an energy storage inverter controller connected with an energy storage inverter, and a battery assistance device and a battery management system which are connected with a flow battery body are all connected with an output end of a UPS. An input end of the UPS is connected with an AC bus via a transformer. When the AC bus supplies electric power normally, a voltage which is transformed from a voltage of the AC bus via a transformer is stabilized and supplied to the energy storage inverter controller, the battery assistance device and the battery management system by the UPS. When the power supply of the AC bus is interrupted, the UPS directly supplies DC electric energy of the battery to the energy storage inverter controller, the battery assistance device and the battery management system through the method of inverter zero switching. Here, the flow battery body comprises an cell stack, a positive electrolyte storage tank, a negative electrolyte storage tank and an electrolyte circulation pipe. The battery assistance device is an essential device for maintaining the circulation of electrolyte and at least comprises a circulation pump and an electric valve on the electrolyte circulation pipeline. The above manner has the following problems: the UPS usually comprises a plurality of devices such as a host and a battery body, resulting in a large required space and high cost. When an AC grid is abnormal or loses power, the operating time of the flow battery depends on the UPS capacity, and the backup time is very short. After the flow battery is powered off, the remaining electric energy in the cell stack will be released in a form of electric leakage, which will result in more power loss and reduce the battery efficiency.

SUMMARY

With respect to the above problems, the present disclosure provides a flow battery control method, a flow battery control system and a flow battery.

The present disclosure adopts the following technical means:

a flow battery control method comprises the following steps:

step A1: acquiring a current electrolyte capacity decay rate of a flow battery;

step A2: comparing the current electrolyte capacity decay rate of the flow battery with a first preset decay rate and a second preset decay rate, and executing step A3; and step A3: when the current electrolyte capacity decay rate of the flow battery is greater than the first preset decay rate and less than the second preset decay rate, adjusting a liquid level of positive electrolyte and a liquid level of negative electrolyte, such that a difference between the liquid levels of the positive electrolyte and the negative electrolyte is less than a preset value, a ratio of the total amount of vanadium in the positive electrolyte to the total amount of vanadium in the negative electrolyte remains in a first preset ratio range, or a ratio of a vanadium ion concentration in the positive electrolyte to a vanadium ion concentration in the negative electrolyte remains in a second preset ratio range.

Further, when the current electrolyte capacity decay rate of the flow battery is greater than or equal to the second preset decay rate, a capacity recovery agent is added to a positive electrolyte storage tank and a negative electrolyte storage tank.

Further, the step A1 specifically comprises the following steps:

step A100: monitoring an operating state parameter of the flow battery; and step A101: acquiring the current electrolyte capacity decay rate of the flow battery according to the monitored operating state parameter of the flow battery and in combination with a corresponding relationship between the operating state parameter of the flow battery and the electrolyte capacity decay rate.

Further, the flow battery control method, before the step A100, further comprises the following step:

determining and storing a corresponding relationship between the operating state parameter of the flow battery and the electrolyte capacity decay rate;

wherein the step of determining the corresponding relationship between the operating state parameter of the flow battery and the electrolyte capacity decay rate specifically comprises:

obtaining an initial operating state parameter of the flow battery;

performing charging and discharging experiments on the flow battery to acquire different operating state parameters of the flow battery during the charging and discharging experiments;

sampling the positive electrolyte and the negative electrode for a plurality of times along with the changes of the operating state parameters of the flow battery during the charging and discharging experiments, and acquiring vanadium ion concentrations of the sampled positive electrolyte and negative electrolyte;

calculating a corresponding electrolyte capacity decay rate condition according to the acquired vanadium ion concentrations of the positive electrolyte and the negative electrolyte; and obtaining a corresponding relationship between the operating state parameter of the flow battery and the electrolyte capacity decay rate.

In addition, the control method further comprises the following steps:

step C1: detecting current SOC of the flow battery; and step C2: obtaining a maximum chargeable power value of the flow battery or a maximum dischargeable power value of the flow battery under the current SOC according to the detected SOC of the flow battery and in combination with a corresponding relationship among the SOC of the flow battery, the maximum chargeable power value of the flow battery and the maximum dischargeable power value of the flow battery, and uploading the maximum chargeable power value or the maximum dischargeable power value of the flow battery.

Further, the flow battery is connected with an energy storage inverter to form an energy storage system and comprises a battery management system, and the control method further comprises the following step:

disposing a distributed I/O site in the flow battery on site in advance, connecting the battery management system and the energy storage inverter, and connecting the battery management system and an energy storage power station monitoring system or an energy management system; wherein the battery management system collects the operating parameter of the flow battery through the distributed I/O site, and the energy storage inverter transmits operating data to the battery management system, and receives control data of the energy storage inverter from the battery management system;

the battery management system uploads the operating data of the energy storage inverter and the operating parameters of the flow battery to the energy storage power station monitoring system or the energy management system, and receives an electric energy scheduling instruction for the energy storage system from the energy storage power station monitoring system or the energy management system.

In addition, the control method further comprises the following steps:

step D1: acquiring, by the battery management system, a maximum chargeable power value or a maximum dischargeable power value of the flow battery in real time, and uploading the acquired maximum chargeable power value or maximum dischargeable power value to the energy storage power station monitoring system or the energy management system, and executing step D2;

step D2: comparing a scheduling power value included in the electric energy scheduling instruction with the maximum chargeable power value or the maximum dischargeable power value before the energy storage power station monitoring system or the energy management system issues the electric energy scheduling instruction; executing step D3 if the maximum chargeable power value or the maximum dischargeable power value is greater than the scheduling power value; executing step D4 if the maximum chargeable power value or the maximum dischargeable power value is less than or equal to the scheduling power value;

step D3: issuing the electric energy scheduling instruction by the energy storage power station monitoring system or the energy management system directly; and step D4: adjusting, by the energy storage power station monitoring system or the energy management system, the scheduling power value included in the electric energy scheduling instruction to be equal to the maximum chargeable power value or the maximum dischargeable power value, and then issuing the electric energy scheduling instruction to the battery management system.

In addition, the control method further comprises the following step:

adjusting, by the battery management system, an operating state of the energy storage inverter according to the acquired operating parameters of the flow battery, wherein when the operating parameter of the flow battery is abnormal, the battery management system controls the energy storage inverter to stop operating; the operating parameter of the flow battery at least includes a voltage of the flow battery; when the voltage of the flow battery is higher than a first voltage limit value or lower than a second voltage limit value, the battery management system controls the energy storage inverter to change an operating mode from a constant power mode to a constant voltage mode.

Further, the flow battery comprises a flow battery body, and a battery assistance device and a battery management system which are connected with the flow battery body; the flow battery body is connected with a DC side of the energy storage inverter; an energy storage inverter controller is connected to the energy storage inverter; the energy storage inverter is connected with an AC bus; a UPS is also connected to an AC side of the energy storage inverter; an output end of the UPS is connected with the battery management system and the battery assistance device; and the control method further comprises the following steps:

step E1: determining whether an power grid is able to supply electric power normally, if so, returning to step E1, or executing step E2;

step E2: outputting, by the UPS serving as a starting power source of the flow battery body, electric energy to supply electric power to the battery assistance device, the battery management system and the energy storage inverter, and executing step E3;

step E3: determining whether a voltage of the flow battery body satisfies a minimum operating voltage of the energy storage inverter, if so, executing step E4, or returning to step E3; and step E4: controlling, by the energy storage inverter controller, the energy storage inverter to enter a V/F control mode, wherein the energy storage inverter adjusts an output voltage so that a voltage of the AC bus satisfies specified electric energy quality requirements, and the UPS enters a bypass mode.

In addition, the control method further comprises the following step:

when the power grid is able to supply electric power normally and after the flow battery is powered off, controlling the energy storage inverter by the energy storage inverter controller to release the remaining electric energy in the flow battery body to the UPS.

In addition, the control method further comprises the following steps:

step F1: acquiring a current electrolyte temperature, SOC, a charge power or discharge power, and an electrolyte capacity decay rate of the flow battery;

step F2: determining an electrolyte temperature range to which the current electrolyte temperature of the flow battery belongs, an SOC range to which the current SOC belongs, a charge power range to which the current charge power belongs or a discharge power range to which the current discharge power belongs, and a capacity decay rate range to which the current electrolyte capacity decay rate belongs;

step F3: obtaining an optimal electrolyte flow rate parameter according to the determined electrolyte temperature range, SOC range, charge power range or discharge power range and capacity decay rate range, and in combination with a corresponding relationship among the electrolyte temperature range, the SOC range, the charge power range, the capacity decay rate range and an optimal electrolyte flow rate, or in combination with a corresponding relationship among the electrolyte temperature range, the SOC range, the discharge power range, the capacity decay rate range and the optimal electrolyte flow rate; and step F4: adjusting the current electrolyte flow rate of the flow battery to obtain the optimal electrolyte flow rate.

In addition, the control method further comprises the following steps:

step G1: acquiring a current electrolyte temperature, SOC, a charge power or discharge power, and an electrolyte capacity decay rate of the flow battery;

step G2: determining an electrolyte temperature range to which the current electrolyte temperature of the flow battery belongs, an SOC range to which the current SOC belongs, a charge power range to which the current charge power belongs or a discharge power range to which the current discharge power belongs, and a capacity decay rate range to which the current electrolyte capacity decay rate belongs;

step G3: obtaining a parameter of an optimal difference between volumes of positive electrolyte and negative electrolyte according to the determined electrolyte temperature range, SOC range, charge power range or discharge power range and capacity decay rate range, and in combination with a corresponding relationship among the electrolyte temperature range, the SOC range, the charge power range, the capacity decay rate range and an optimal difference between volumes of the positive electrolyte and the negative electrolyte, or in combination with a corresponding relationship among the electrolyte temperature range, the SOC range, the discharge power range, the capacity decay rate range and the optimal difference between volumes of the positive electrolyte and the negative electrolyte; and step G4: adjusting the current difference between the volumes of the positive electrolyte and the negative electrolyte of the flow battery to obtain the optimal difference between volumes of the positive electrolyte and the negative electrolyte.

In addition, the control method further comprises the following steps:

step K1: determining whether the flow battery is powered off, if so, executing step K2, or returning to step K1;

step K2: controlling the flow battery to continue to supply electric energy to a load and/or a battery assistance device, and executing K3, wherein the load is a load which is connected when the flow battery operates normally;

step K3: determining whether the flow battery supplies electric energy to the load and/or the battery assistance device, if so, executing step K4, or executing step K7;

step K4: detecting a discharge power of the flow battery, and executing step K5;

step K5: determining whether the discharge power of the flow battery reaches a discharge power threshold, if so, executing step K7 and ending directly, or returning to step K3; and step K7: executing forced electric leakage protection, and ending.

A flow battery control system comprises:

a first acquisition unit configured to acquire a current electrolyte capacity decay rate of a flow battery;

a first comparison unit connected with the first acquisition unit and configured to compare the current electrolyte capacity decay rate of the flow battery with a first preset decay rate and a second preset decay rate; and a first control unit connected with the first comparison unit and configured to, when the current electrolyte capacity decay rate of the flow battery is greater than the first preset decay rate and less than the second preset decay rate, adjust a liquid level of positive electrolyte and a liquid level of negative electrolyte, such that a difference between the liquid levels of the positive electrolyte and the negative electrolyte is less than a preset value, a ratio of the total amount of vanadium in the positive electrolyte to the total amount of vanadium in the negative electrolyte remains in a first preset ratio range, or a ratio of a vanadium ion concentration in the positive electrolyte to a vanadium ion concentration in the negative electrolyte remains in a second preset ratio range.

Further, when the current electrolyte capacity decay rate of the flow battery is greater than or equal to the second preset decay rate, a capacity recovery agent is added to a positive electrolyte storage tank and a negative electrolyte storage tank.

Further, the capacity recovery agent is at least one of CxHyOz organic molecules containing at least one hydroxyl group, wherein $1 \leq x \leq 12$, $2 \leq y \leq 12$, and $1 \leq z \leq 12$.

Further, the control system further comprises a first monitoring unit configured to monitor an operating state parameter of the flow battery, wherein the first acquisition unit is connected with the first monitoring unit and configured to acquire the current electrolyte capacity decay rate of the flow battery according to the monitored operating state parameter of the flow battery and in combination with a corresponding relationship between the operating state parameter of the flow battery and the electrolyte capacity decay rate.

Further, the control system further comprises a first calculation unit connected with the first acquisition unit and configured to calculate a use amount of the capacity recovery agent required to be added according to the current electrolyte capacity decay rate of the flow battery obtained by the first acquisition unit, and current volumes of the positive electrolyte and the negative electrolyte of the flow battery.

In addition, the control system further comprises:

a third monitoring unit configured to detect SOC of the flow battery; and a second processing unit connected with the third monitoring unit and configured to obtain a maximum chargeable power value of the flow battery or a maximum dischargeable power value of the flow battery under the current SOC according to the detected SOC of the flow battery and in combination with a corresponding relationship among the SOC of the flow battery, the maximum chargeable power value of the flow battery and the maximum dischargeable power value of the flow battery.

In addition, the control system further comprises:

an energy storage inverter and a battery management system which are connected with the flow battery, wherein the flow battery and the energy storage inverter form an energy storage system; the battery management system is connected with the energy storage inverter; the battery management system acquires operating data of the energy storage inverter directly and controls an operating state of the energy storage inverter;

an energy storage power station monitoring system or energy management system connected with the battery management system, wherein the battery management system uploads the operating data of the energy storage inverter and the operating parameters of the flow battery to the energy storage power station monitoring system or the energy management system, and receives an electric energy scheduling instruction for the energy storage system from the energy storage power station monitoring system or the energy management system; and a distributed I/O site disposed in the flow battery on site, wherein the battery management system collects the operating parameters of the flow battery through the distributed I/O site.

Further, the battery management system adjusts an operating state of the energy storage inverter according to the acquired operating parameters of the flow battery; when the operating parameter of the flow battery is abnormal, the battery management system controls the energy storage inverter to stop operating; the operating parameter of the flow battery at least includes a voltage of the flow battery; when the voltage of the flow battery is higher than a first voltage limit value or lower than a second voltage limit value, the battery management system controls the energy storage inverter to change an operating mode from a constant power mode to a constant voltage mode.

Further, the control system also comprises:

a battery management system connected with the flow battery and configured to acquire a current maximum chargeable power value or maximum dischargeable power value of the flow battery in real time, and upload the acquired maximum chargeable power value or maximum dischargeable power value to the energy storage power station monitoring system or the energy management system;

an energy storage power station monitoring system or energy management system connected with the battery management system and configured to issue an electric energy scheduling instruction to the battery management system; and a second comparison unit connected with the energy storage power station monitoring system or the energy management system and the battery management system and configured to compare a scheduling power value included in the electric energy scheduling instruction with the maximum chargeable power value or the maximum dischargeable power value before the energy storage power station monitoring system or the energy management system issues the electric energy scheduling instruction, wherein the energy storage power station monitoring system or the energy management system issues the electric energy scheduling instruction directly to the battery management system when the maximum chargeable power value and the maximum dischargeable power value is greater than the scheduling power value; the energy storage power station monitoring system or the energy management system adjusts the scheduling power value included in the electric energy scheduling instruction to be equal to the maximum chargeable power value or the maximum dischargeable power value when the maximum chargeable power value or the maximum dischargeable power value is less than or equal to the scheduling power value, and then issues the electric energy scheduling instruction to the battery management system.

Further, the flow battery comprises a flow battery body, and a battery assistance device and a battery management system which are connected with the flow battery body; the flow battery body is connected with a DC side of the energy storage inverter; an energy storage inverter controller is connected to the energy storage inverter; the energy storage inverter is connected with an AC bus; a UPS is also connected to an AC side of the energy storage inverter; an output end of the UPS is connected with the battery management system and the battery assistance device, wherein the control system further comprises:

a first determination unit configured to determine whether a power grid is able to supply electric power normally; when the power grid is not able to supply electric power normally, the UPS, serving as a starting power source of the flow battery body, outputs electric energy to supply electric power to the battery assistance device, the battery management system and the energy storage inverter; and a second determination unit configured to determine whether a voltage of the flow battery body satisfies a minimum operating voltage of the energy storage inverter after the UPS serves as the starting power source of the flow battery body; when the voltage of the flow battery body satisfies the minimum operating voltage of the energy storage inverter, the energy storage inverter controller controls the energy storage inverter to enter a V/F control mode, wherein the energy storage inverter adjusts an output voltage so that a voltage of the AC bus satisfies specified electric energy quality requirements, and the UPS enters a bypass mode; when the power grid is able to supply electric power normally and after the flow battery is powered off, the energy storage inverter controller controls the energy storage inverter to release the remaining electric energy in the flow battery body to the UPS.

Further, the control system further comprises:

a second monitoring unit configured to detect an electrolyte temperature;

a third monitoring unit configured to detect SOC of the flow battery;

a fourth acquisition unit configured to acquire a current charge power or discharge power of the flow battery;

a first determination unit connected with the second monitoring unit, the third monitoring unit, the fourth acquisition unit and the first acquisition unit and configured to determine an electrolyte temperature range to which the current electrolyte temperature of the flow battery belongs, an SOC range to which the current SOC belongs, a charge power range to which the current charge power belongs or a discharge power range to which the current discharge power belongs, and a capacity decay rate range to which the current electrolyte capacity decay rate belongs;

a third processing unit connected with the first determination unit and configured to obtain an optimal electrolyte flow rate parameter according to the determined electrolyte temperature range, SOC range, charge power range or discharge power range and capacity decay rate range, and in combination with a corresponding relationship among the electrolyte temperature range, the SOC range, the charge power range, the capacity decay rate range and an optimal electrolyte flow rate, or in combination with a corresponding relationship among the electrolyte temperature range, the SOC range, the discharge power range, the capacity decay rate range and the optimal electrolyte flow rate; and a second control unit connected with the third processing unit and configured to adjust the current electrolyte flow rate of the flow battery to obtain the optimal electrolyte flow rate.

Further, the control system further comprises:

a second monitoring unit configured to detect an electrolyte temperature;

a third monitoring unit configured to detect SOC of the flow battery;

a fourth acquisition unit configured to acquire a current charge power or discharge power of the flow battery;

a first determination unit connected with the second monitoring unit, the third monitoring unit, the fourth acquisition unit and the first acquisition unit and configured to determine an electrolyte temperature range to which the current electrolyte temperature of the flow battery belongs, an SOC range to which the current SOC belongs, a charge power range to which the current charge power belongs or a discharge power range to which the current discharge power belongs, and a capacity decay rate range to which the current electrolyte capacity decay rate belongs;

a fourth processing unit connected with the first determination unit and configured to obtain a parameter of an optimal difference between volumes of positive electrolyte and negative electrolyte according to the determined electrolyte temperature range, SOC range, charge power range or discharge power range and capacity decay rate range, and in combination with a corresponding relationship among the electrolyte temperature range, the SOC range, the charge power range, the capacity decay rate range and an optimal difference between volumes of the positive electrolyte and the negative electrolyte, or in combination with a corresponding relationship among the electrolyte temperature range, the SOC range, the discharge power range, the capacity decay rate range and the optimal difference between volumes of the positive electrolyte and the negative electrolyte; and a third control unit connected with the fourth processing unit and configured to adjust the current difference between the volumes of the positive electrolyte and the negative electrolyte of the flow battery to obtain the optimal difference between volumes of the positive electrolyte and the negative electrolyte.

In addition, the control system further comprises:

a sixth determination unit configured to determine whether the flow battery is powered off, a fifth control unit connected with the sixth determination unit and configured to control the flow battery to continue to supply electric energy to a load and/or the battery assistance device after the flow battery is powered off, wherein the load is a load which is connected when the flow battery operates normally; after the flow battery is powered off, if the flow battery does not supply electric energy to the load and/or the battery assistance device, the fifth control unit performs a forced electric leakage protection operation on the flow battery;

a fourth monitoring unit configured to, after the flow battery is powered off, detect a discharge power of the flow battery when the flow battery continues to supply electric energy to the load and/or the battery assistance device; and a seventh determination unit connected with the fourth monitoring unit and configured to determine whether the discharge power of the flow battery reaches a discharge power threshold, wherein when the discharge power of the flow battery reaches the discharge power threshold, the fifth control unit performs the forced electric leakage protection operation on the flow battery or the control system stops working.

A flow battery comprises the above-mentioned flow battery control system

Due to the adoption of the above technical solution, compared with the prior art, the flow battery control method, the flow battery control system and the flow battery provided by the present disclosure have the following advantages:

1. according to the present disclosure, different control strategies, including a mode of adjusting the difference between liquid levels of the positive electrolyte and the negative electrolyte at a lower decay degree and a mode of adding the capacity recovery agent at a higher decay degree can be adopted according to different capacity decay degrees of the flow battery. Different control strategies are adopted for different decay degrees, which can effectively improve the capacity retention capacity of the flow battery, reduce the cost of the capacity recovery agent, and keep the long-term stability in terms of the capacity and performances of the flow battery;

2. the capacity decay degree can be monitored and controlled on line; the capacity decay condition of the flow battery at any moment and under any state can be acquired; the electrolyte sampling and analysis steps in the flow battery project site are omitted, such that the operation is convenient and the practicability is high, and the manpower, material resources and financial resources at the operation and maintenance phases of the flow battery are greatly saved;

3. when a power grid is powered off, the battery assistance device and the energy storage inverter controller are powered by the UPS; when the flow battery stops operating, the remaining electric power in the cell stack is consumed by charging the UPS to improve the battery efficiency and the utilization rate;

4. a difference between the volumes of positive electrolyte and negative electrolyte is configured according to current operating state parameters of the flow battery, and corresponding electrolyte flow rates are controlled, such that continuous operation of the flow battery under an optimal condition can be ensured, the flow rate requirements of the flow battery can be satisfied, and the power consumption of the circulation pump can be reduced.

BRIEF DESCRIPTION OF THE DRAWINGS

In order to more clearly illustrate the embodiments of the present disclosure or the technical solutions in the prior art, the drawings used in the embodiments or the prior art description will be briefly described below. It is apparent that the drawings in the following description are some embodiments of the present disclosure, and other drawings may also be obtained by those of ordinary skill in the art according to these drawings, without paying creative work.

Figure 1:
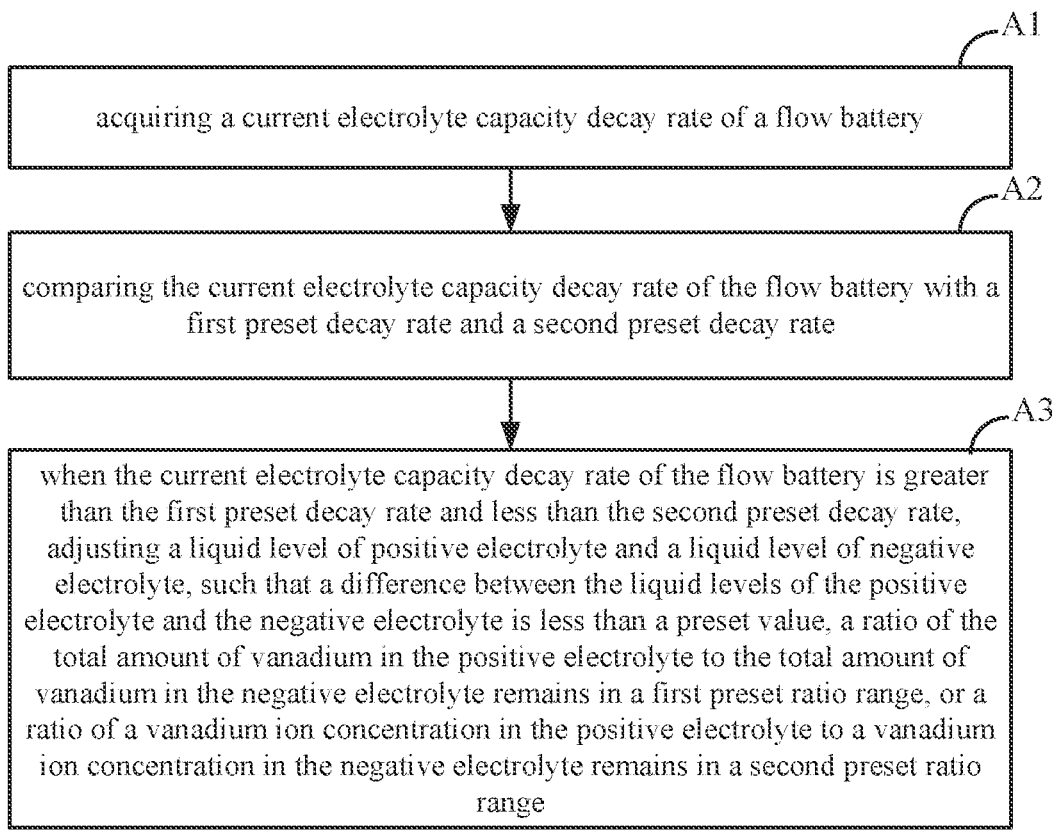
FIG. 1 is a flowchart from step A1 to step A3 in the control method of the present disclosure.

In the drawings, numerical symbols represent the following components: 1—liquid delivery pipeline; 2—electric valve; 3—positive electrolyte storage tank; 4—negative electrolyte storage tank; 5—circulation pump; 6—cell stack; 7—feeding hole; 9—energy storage inverter; 10—field bus; 11—distributed I/O site; 12—battery management system; 13—transformer; 14—flow battery body; 15—UPS; 61—positive electrolyte outlet; 62—negative electrolyte outlet; 63—positive electrolyte inlet; 64—negative electrolyte inlet.

DETAILED DESCRIPTIONS OF THE PREFERRED EMBODIMENTS

In order to illustrate the objectives, technical solutions and advantages of the embodiments of the present disclosure more clearly, the technical solutions in the embodiments of the present disclosure are clearly and completely described below with reference to the accompanying drawings in the embodiments of the present disclosure. It is apparent that the described embodiments are a part of the embodiments of the present disclosure, rather than all of the embodiments. All other embodiments obtained by those of ordinary skill in the art based on the embodiments of the present disclosure without paying creative work fall within the protection scope of the present disclosure.

As shown in FIG. 1, a flow battery control method comprises the following steps:

step A1: acquiring a current electrolyte capacity decay rate of a flow battery;

step A2: comparing the current electrolyte capacity decay rate of the flow battery with a first preset decay rate and a second preset decay rate, and executing step A3; and step A3: when the current electrolyte capacity decay rate of the flow battery is greater than the first preset decay rate and less than the second preset decay rate, adjusting a liquid level of positive electrolyte and a liquid level of negative electrolyte, such that a difference between the liquid levels of the positive electrolyte and the negative electrolyte is less than a preset value, a ratio of the total amount of vanadium in the positive electrolyte to the total amount of vanadium in the negative electrolyte remains in a first preset ratio range, or a ratio of a vanadium ion concentration in the positive electrolyte to a vanadium ion concentration in the negative electrolyte remains in a second preset ratio range.

Further, when the current electrolyte capacity decay rate of the flow battery is greater than or equal to the second preset decay rate, a capacity recovery agent is added to a positive electrolyte storage tank and a negative electrolyte storage tank.

Further, the step A1 specifically comprises the following steps:

step A100: monitoring an operating state parameter of the flow battery; and step A101: acquiring the current electrolyte capacity decay rate of the flow battery according to the monitored operating state parameter of the flow battery and in combination with a corresponding relationship between the operating state parameter of the flow battery and the electrolyte capacity decay rate.

Further, the flow battery control method, before the step A100, further comprises the following step:

determining and storing a corresponding relationship between the operating state parameter of the flow battery and the electrolyte capacity decay rate;

wherein the step of determining the corresponding relationship between the operating state parameter of the flow battery and the electrolyte capacity decay rate specifically comprises:

obtaining an initial operating state parameter of the flow battery;

performing charging and discharging experiments on the flow battery to acquire different operating state parameters of the flow battery during the charging and discharging experiments;

sampling the positive electrolyte and the negative electrode for a plurality of times along with the changes of the operating state parameters of the flow battery during the charging and discharging experiments, and acquiring vanadium ion concentrations of the sampled positive electrolyte and negative electrolyte;

calculating a corresponding electrolyte capacity decay rate condition according to the acquired vanadium ion concentrations of the positive electrolyte and the negative electrolyte; and obtaining a corresponding relationship between the operating state parameters of the flow battery and the electrolyte capacity decay rate.

In addition, the control method further comprises the following steps:

step C1: detecting current SOC of the flow battery; and step C2: obtaining a maximum chargeable power value of the flow battery or a maximum dischargeable power value of the flow battery under the current SOC according to the detected SOC of the flow battery and in combination with a corresponding relationship among the SOC of the flow battery, the maximum chargeable power value of the flow battery and the maximum dischargeable power value of the flow battery and uploading the maximum chargeable power value or the maximum dischargeable power value of the flow battery.

Further, the flow battery is connected with an energy storage inverter to form an energy storage system and comprises a battery management system, and the control method further comprises the following step:

disposing a distributed I/O site in the flow battery on site in advance, connecting the battery management system and the energy storage inverter, and connecting the battery management system and an energy storage power station monitoring system or an energy management system; wherein the battery management system collects the operating parameters of the flow battery through the distributed I/O site, and the energy storage inverter transmits operating data to the battery management system, and receives control data of the energy storage inverter from the battery management system;

the battery management system uploads the operating data of the energy storage inverter and the operating parameters of the flow battery to the energy storage power station monitoring system or the energy management system, and receives an electric energy scheduling instruction for the energy storage system from the energy storage power station monitoring system or the energy management system.

Figure 2:
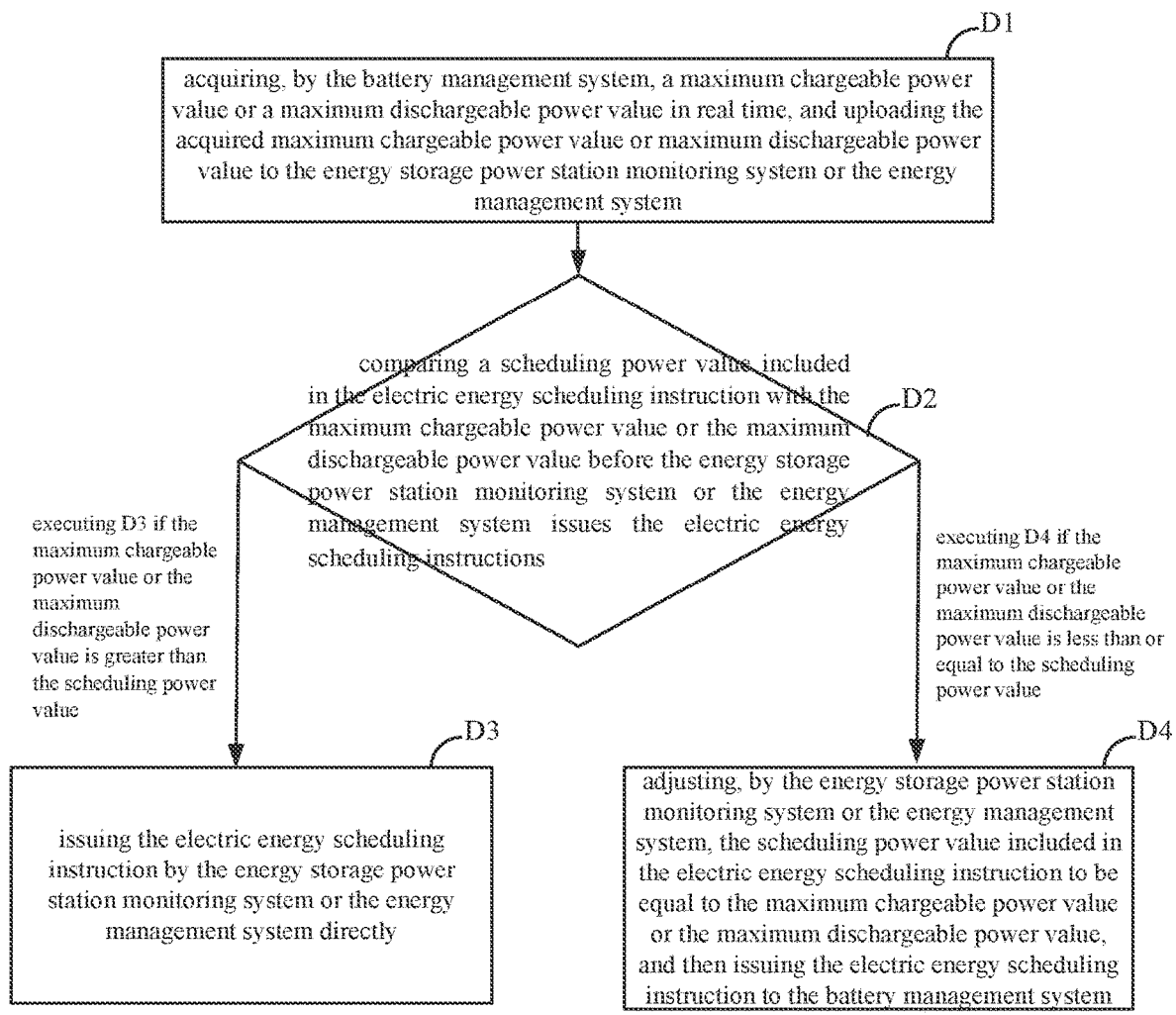
FIG. 2 is a flowchart from step D1 to step D4 in the control method of the present disclosure.

As shown in FIG. 2, in addition, the control method further comprises the following steps:

step D1: acquiring, by the battery management system, a maximum chargeable power value or a maximum dischargeable power value in real time, and uploading the acquired maximum chargeable power value or maximum dischargeable power value to the energy storage power station monitoring system or the energy management system, and executing step D2;

step D2: comparing a scheduling power value included in the electric energy scheduling instruction with the maximum chargeable power value or the maximum dischargeable power value before the energy storage power station monitoring system or the energy management system issues the electric energy scheduling instruction; executing step D3 if the maximum chargeable power value or the maximum dischargeable power value is greater than the scheduling power value; executing step D4 if the maximum chargeable power value or the maximum dischargeable power value is less than or equal to the scheduling power value;

step D3: issuing the electric energy scheduling instruction by the energy storage power station monitoring system or the energy management system directly; and step D4: adjusting, by the energy storage power station monitoring system or the energy management system, the scheduling power value included in the electric energy scheduling instruction to be equal to the maximum chargeable power value or the maximum dischargeable power value, and then issuing the electric energy scheduling instruction to the battery management system.

Further, the control method further comprises the following step:

adjusting, by the battery management system, an operating state of the energy storage inverter according to the acquired operating parameters of the flow battery, wherein when the operating parameters of the flow battery are abnormal, the battery management system controls the energy storage inverter to stop operating; the operating parameters of the flow battery at least include a voltage of the flow battery; when the voltage of the flow battery is higher than a first voltage limit value or lower than a second voltage limit value, the battery management system controls the energy storage inverter to change an operating mode from a constant power mode to a constant voltage mode.

Figure 3:
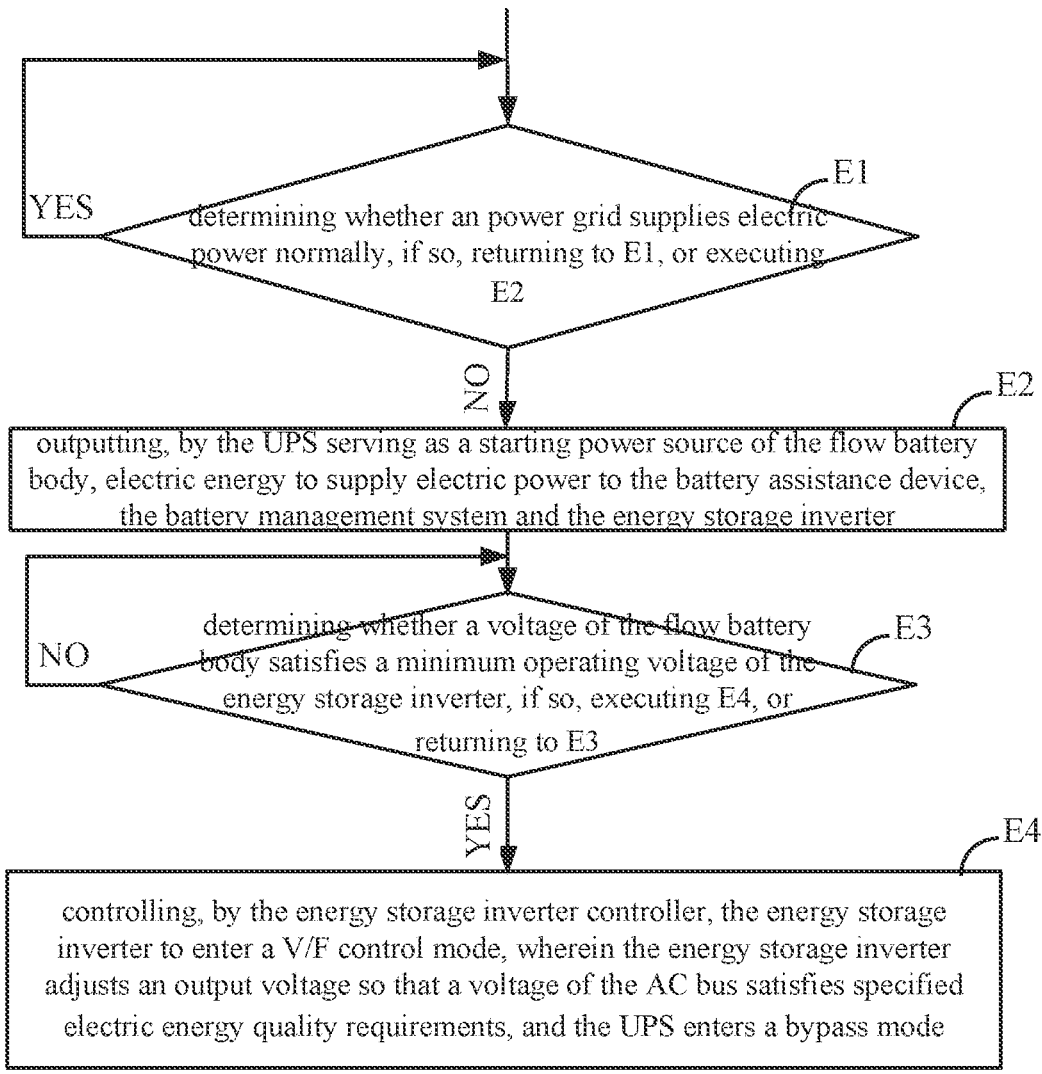
FIG. 3 is a flowchart from step E1 to step E4 in the control method of the present disclosure.

As shown in FIG. 3, further, the flow battery comprises a flow battery body, and a battery assistance device and a battery management system which are connected with the flow battery body; the flow battery body is connected with a DC side of the energy storage inverter; an energy storage inverter controller is connected with the energy storage inverter; the energy storage inverter is connected with an AC bus; a UPS is also connected to an AC side of the energy storage inverter; an output end of the UPS is connected with the battery management system and the battery assistance device; and the control method further comprises the following steps:

step E1: determining whether an power grid is able to supply electric power normally, if so, returning to step E1, or executing step E2;

step E2: outputting, by the UPS serving as a starting power source of the flow battery body, electric energy to supply electric power to the battery assistance device, the battery management system and the energy storage inverter, and executing step E3;

step E3: determining whether a voltage of the flow battery body satisfies a minimum operating voltage of the energy storage inverter, if so, executing step E4, or returning to step E3; and step E4: controlling, by the energy storage inverter controller, the energy storage inverter to enter a V/F control mode, wherein the energy storage inverter adjusts an output voltage so that a voltage of the AC bus satisfies specified electric energy quality requirements, and the UPS enters a bypass mode.

In addition, the control method further comprises the following step:

when the power grid is able to supply electric power normally and after the flow battery is powered off, controlling the energy storage inverter by the energy storage inverter controller to release the remaining electric energy in the flow battery body to the UPS.

Figure 4:
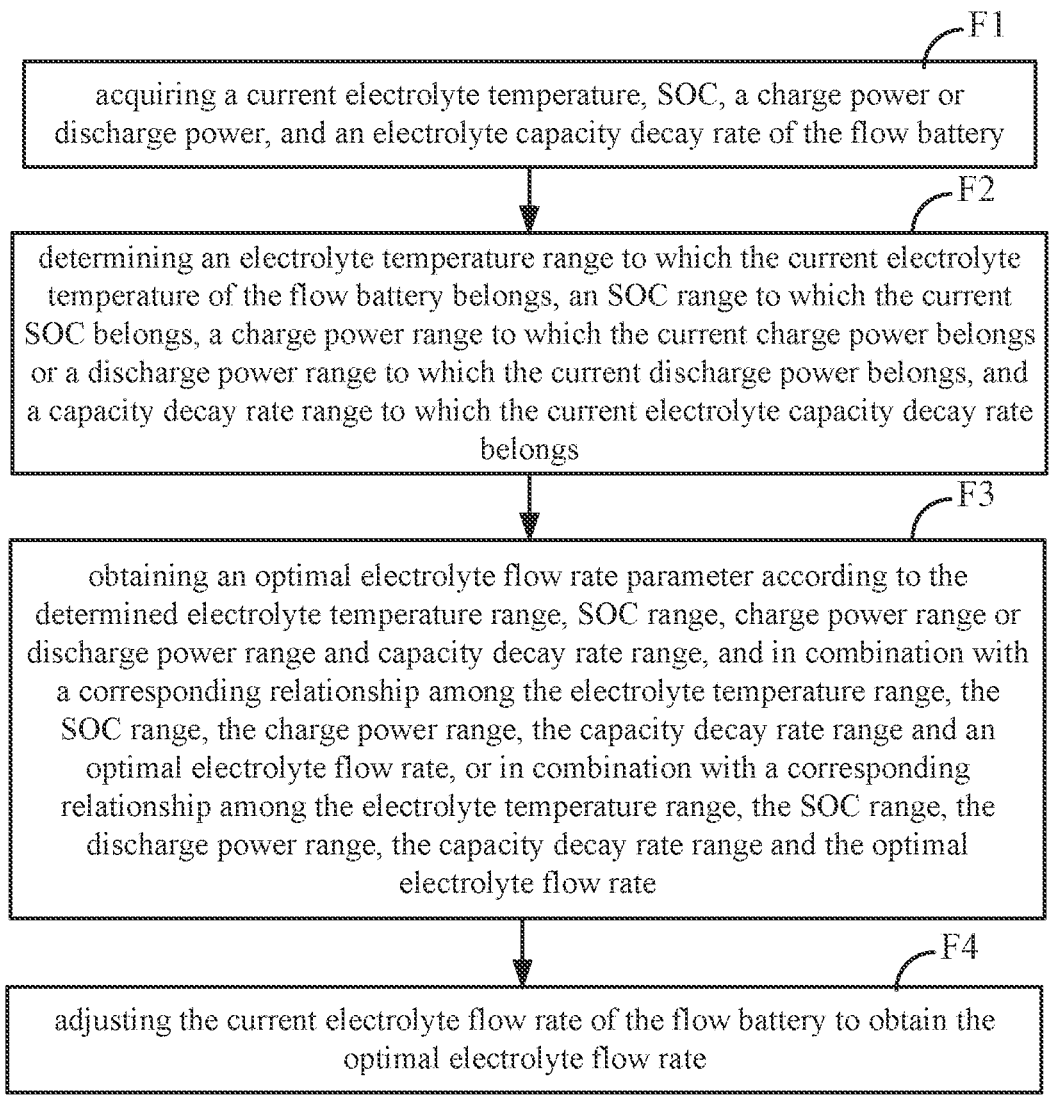
FIG. 4 is a flowchart from step F1 to step F4 in the control method of the present disclosure.

As shown in FIG. 4, in addition, the control method further comprises the following steps:

step F1: acquiring a current electrolyte temperature, SOC, a charge power or discharge power, and an electrolyte capacity decay rate of the flow battery;

step F2: determining an electrolyte temperature range to which the current electrolyte temperature of the flow battery belongs, an SOC range to which the current SOC belongs, a charge power range to which the current charge power belongs or a discharge power range to which the current discharge power belongs, and a capacity decay rate range to which the current electrolyte capacity decay rate belongs;

step F3: obtaining an optimal electrolyte flow rate parameter according to the determined electrolyte temperature range, SOC range, charge power range or discharge power range and capacity decay rate range, and in combination with a corresponding relationship among the electrolyte temperature range, the SOC range, the charge power range, the capacity decay rate range and an optimal electrolyte flow rate, or in combination with a corresponding relationship among the electrolyte temperature range, the SOC range, the discharge power range, the capacity decay rate range and the optimal electrolyte flow rate; and step F4: adjusting the current electrolyte flow rate of the flow battery to obtain the optimal electrolyte flow rate.

Figure 5:
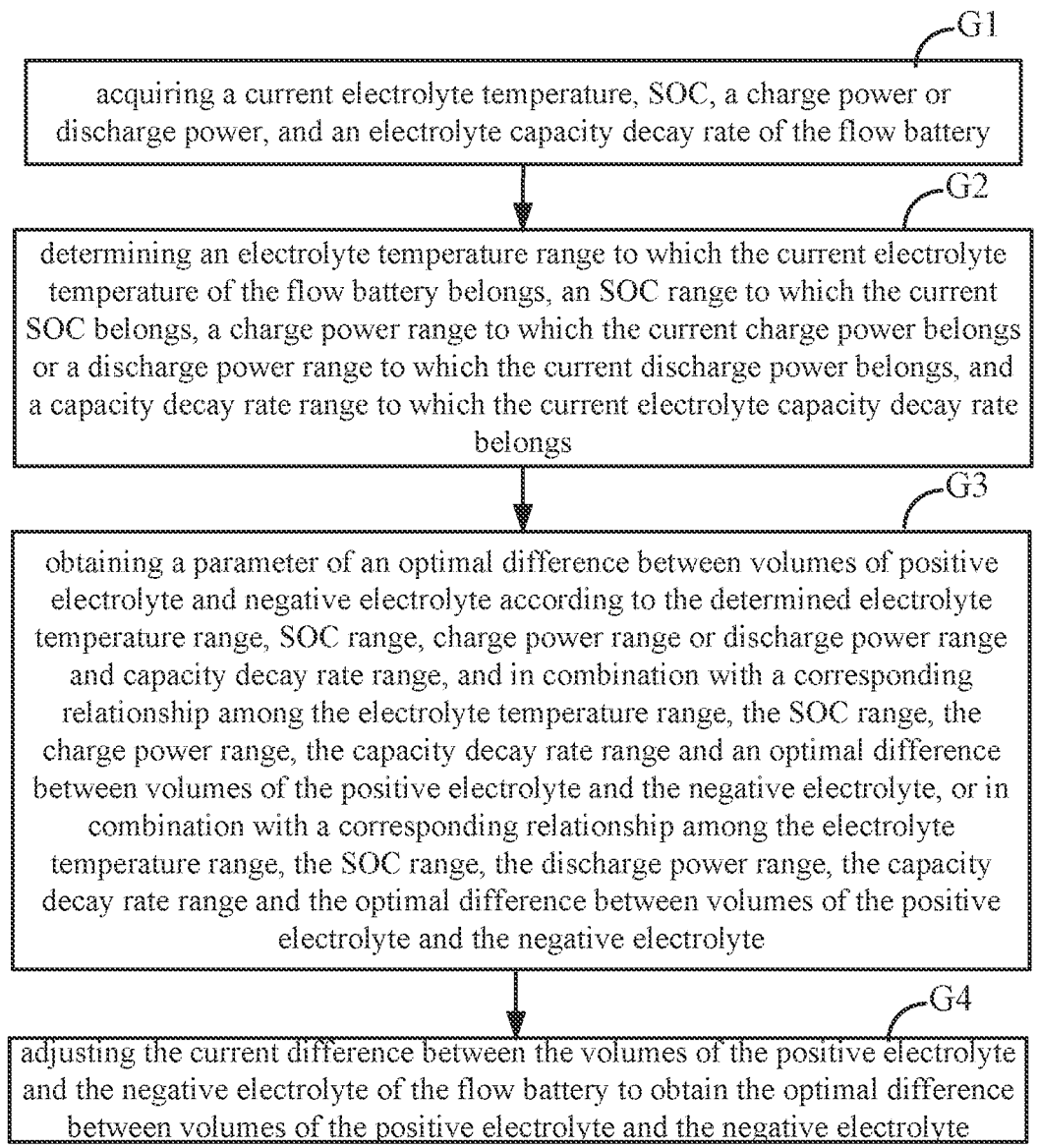
FIG. 5 is a flowchart from step G1 to step G4 in the control method of the present disclosure.

As shown in FIG. 5, in addition, the control method further comprises the following steps:

step G1: acquiring a current electrolyte temperature, SOC, a charge power or discharge power, and an electrolyte capacity decay rate of the flow battery;

step G2: determining an electrolyte temperature range to which the current electrolyte temperature of the flow battery belongs, an SOC range to which the current SOC belongs, a charge power range to which the current charge power belongs or a discharge power range to which the current discharge power belongs, and a capacity decay rate range to which the current electrolyte capacity decay rate belongs;

step G3: obtaining a parameter of an optimal difference between volumes of positive electrolyte and negative electrolyte according to the determined electrolyte temperature range, SOC range, charge power range or discharge power range and capacity decay rate range, and in combination with a corresponding relationship among the electrolyte temperature range, the SOC range, the charge power range, the capacity decay rate range and an optimal difference between volumes of the positive electrolyte and the negative electrolyte, or in combination with a corresponding relationship among the electrolyte temperature range, the SOC range, the discharge power range, the capacity decay rate range and the optimal difference between volumes of the positive electrolyte and the negative electrolyte; and step G4: adjusting the current difference between the volumes of the positive electrolyte and the negative electrolyte of the flow battery to obtain the optimal difference between volumes of the positive electrolyte and the negative electrolyte.

Figure 6:
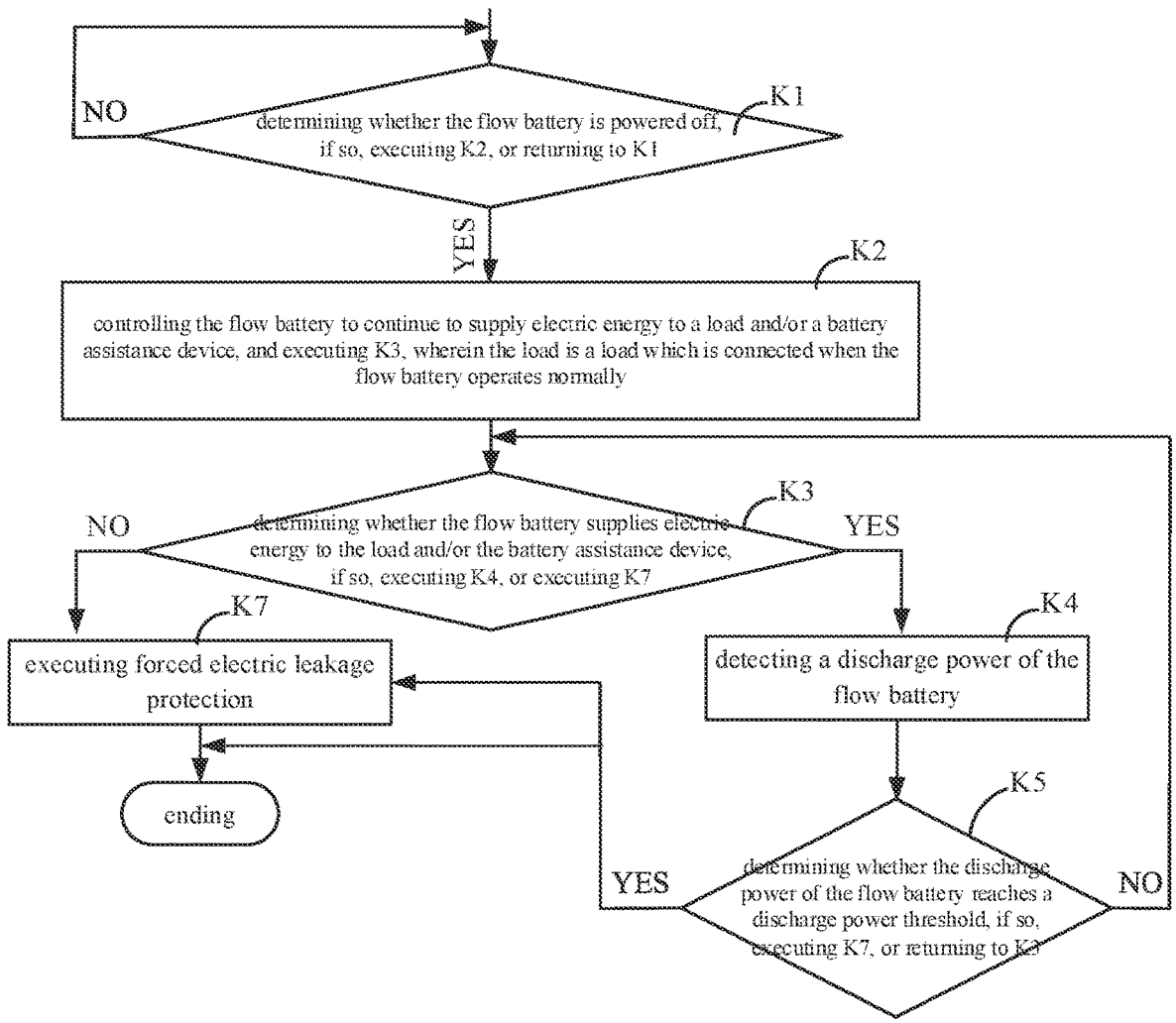
FIG. 6 is a flowchart from step K1 to step K7 in the control method of the present disclosure.

As shown in FIG. 6, in addition, the control method further comprises the following steps:

step K1: determining whether the flow battery is powered off, if so, executing step K2, or returning to step K1;

step K2: controlling the flow battery to continue to supply electric energy to a load and/or a battery assistance device, and executing K3, wherein the load is a load which is connected when the flow battery operates normally;

step K3: determining whether the flow battery supplies electric energy to the load and/or the battery assistance device, if so, executing step K4, or executing step K7;

step K4: detecting a discharge power of the flow battery, and executing step K5;

step K5: determining whether the discharge power of the flow battery reaches a discharge power threshold, if so, executing step K7 and ending directly, or returning to step K3; and step K7: executing forced electric leakage protection, and ending.

Figure 7:
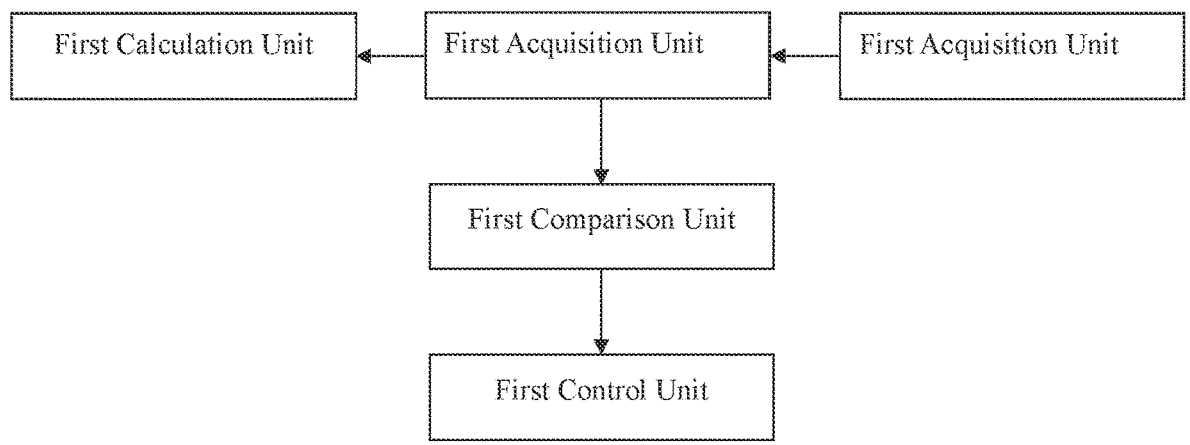
FIG. 7 and FIG. 8 are structural schematic diagrams of a flow battery control system according to Embodiment 1 of the present disclosure.
Figure 7:
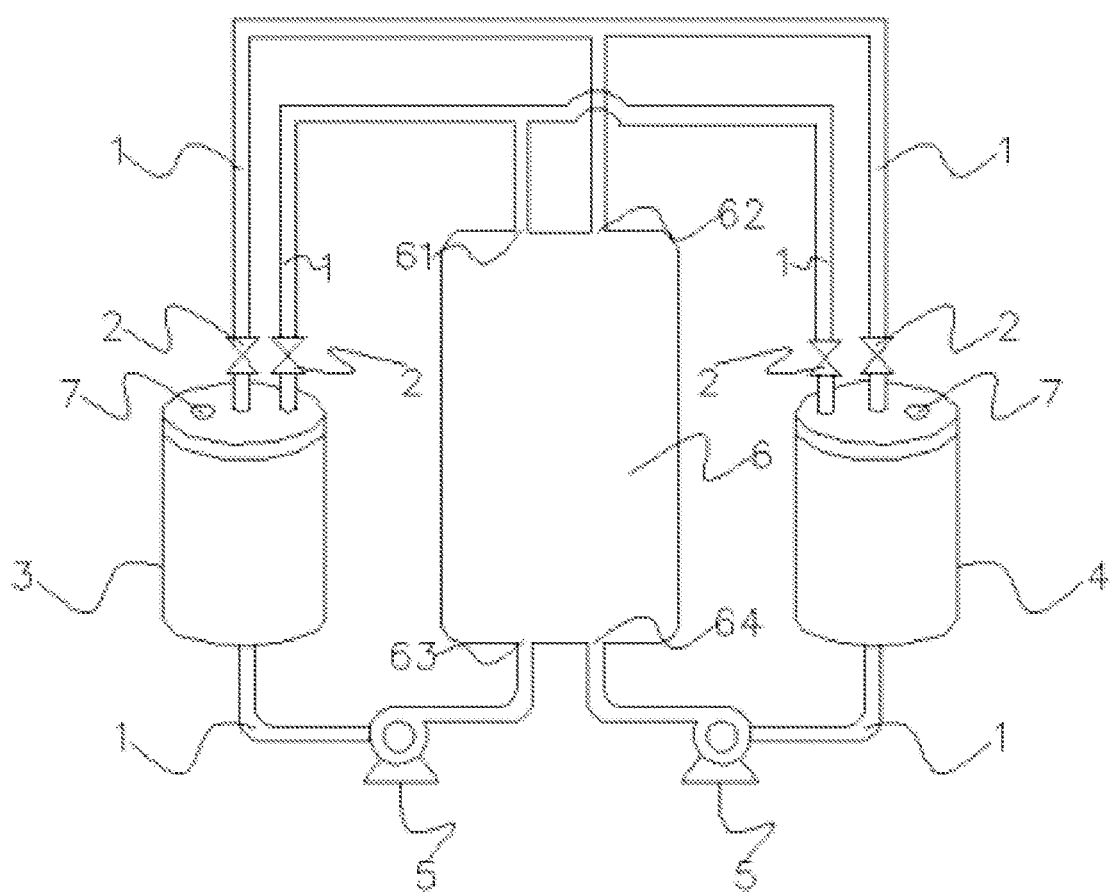
Figure 8:
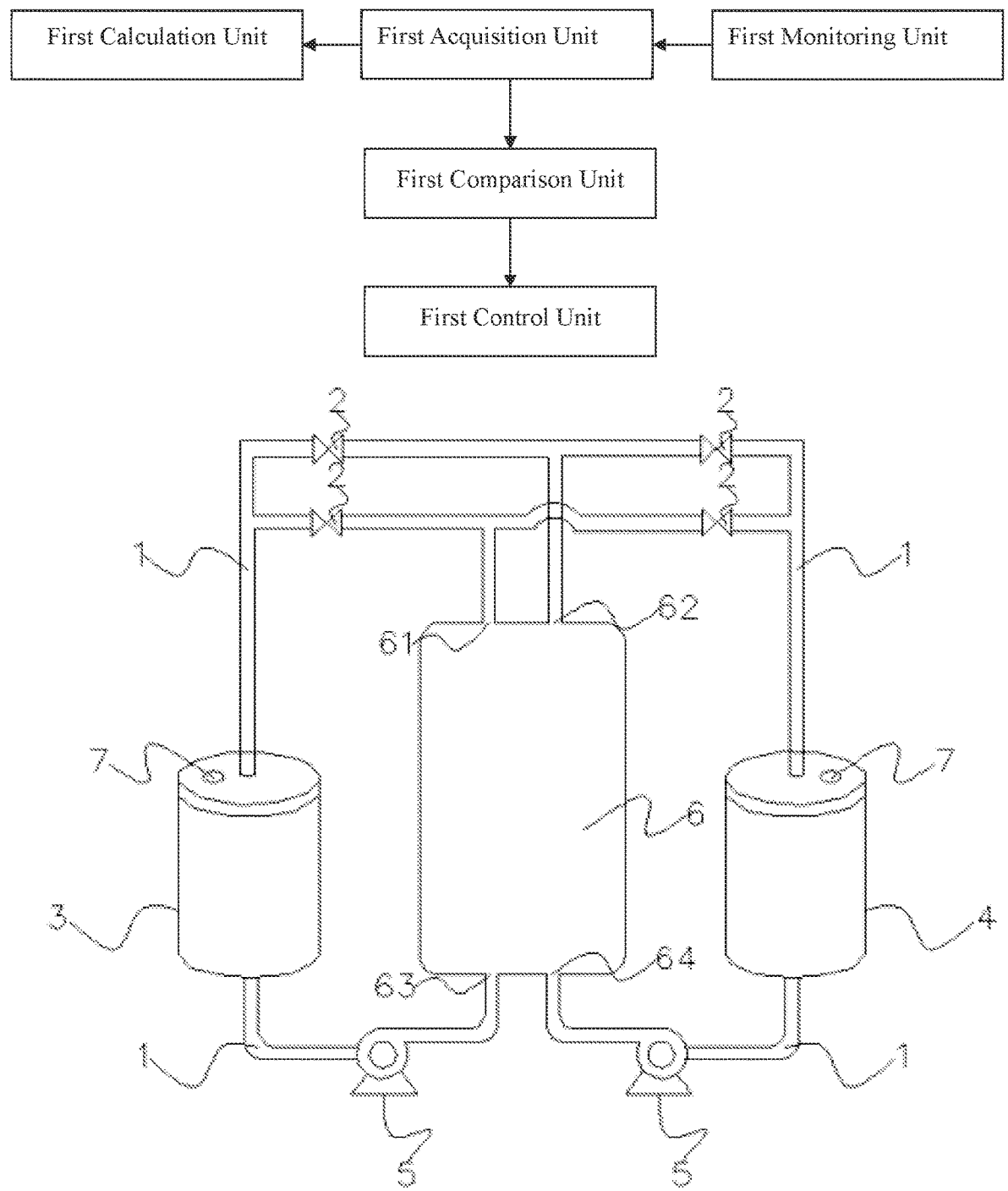

The present disclosure provides a flow battery control system. FIG. 7 and FIG. 8 are structural schematic diagrams of a flow battery control system according to Embodiment 1 of the present disclosure. As shown in FIG. 7 and FIG. 8, the flow battery control system comprises: a first acquisition unit configured to acquire a current electrolyte capacity decay rate of a flow battery; a first comparison unit connected with the first acquisition unit and configured to compare the current electrolyte capacity decay rate of the flow battery with a first preset decay rate and a second preset decay rate; and a first control unit connected with the first comparison unit and configured to, when the current electrolyte capacity decay rate of the flow battery is greater than the first preset decay rate and less than the second preset decay rate, adjust a liquid level of positive electrolyte and a liquid level of negative electrolyte, such that a difference between the liquid levels of the positive electrolyte and the negative electrolyte is less than a preset value, a ratio of the total amount of vanadium in the positive electrolyte to the total amount of vanadium in the negative electrolyte remains in a first preset ratio range, or a ratio of a vanadium ion concentration in the positive electrolyte to a vanadium ion concentration in the negative electrolyte remains in a second preset ratio range. As a preferred technical solution of Embodiment 1, further, when the current electrolyte capacity decay rate of the flow battery is greater than or equal to the second preset decay rate, a capacity recovery agent is added to a positive electrolyte storage tank 3 and a negative electrolyte storage tank 4; here, the positive electrolyte refers to positive electrolyte in the positive electrolyte storage tank 3, and the negative electrolyte refers to negative electrolyte in the negative electrolyte storage tank 4. As a preferred technical solution of Embodiment 1, the control system further comprises a first monitoring unit configured to monitor operating state parameters of the flow battery, wherein the first acquisition unit is connected with the first monitoring unit and configured to acquire the current electrolyte capacity decay rate of the flow battery according to the monitored operating state parameters of the flow battery and in combination with a corresponding relationship between the operating state parameters of the flow battery and the electrolyte capacity decay rate. When the current electrolyte capacity decay rate of the flow battery is less than or equal to a first preset decay rate, the first acquisition unit continues to acquire the current electrolyte capacity decay rate of the flow battery. As a preferred technical solution of Embodiment 1, further, the control system also comprises a first calculation unit connected with the first acquisition unit and configured to acquire a current electrolyte capacity decay rate of the flow battery obtained by the first acquisition unit and calculate a use amount of the capacity recovery agent required to be added according to the current volumes of the positive electrolyte and the negative electrolyte of the flow battery. According to this embodiment, different control strategies, including a mode of adjusting the difference between liquid levels of the positive electrolyte and the negative electrolyte at a lower decay degree and a mode of adding the capacity recovery agent at a higher decay degree can be adopted according to different capacity decay degrees of the flow battery. Different control strategies are adopted for different decay degrees, which can effectively improve the capacity retention capacity of the flow battery, reduce the cost of the capacity recovery agent, and keep the long-term stability in terms of the capacity and performances of the flow battery. The flow battery according to the present disclosure comprises an cell stack 6, a positive electrolyte storage tank 3, a negative electrolyte storage tank 4, liquid delivery pipelines 1 and a circulation pump 5. The positive electrolyte storage tank 3 is connected with a positive electrolyte inlet 63 of the cell stack 6 through the circulation pump 5 via the liquid delivery pipeline 1. A positive electrolyte outlet 61 of the cell stack 6 is connected with the positive electrolyte storage tank 3 and the negative electrolyte storage tank 4 respectively via the liquid delivery pipeline 1. The negative electrolyte storage tank 4 is connected with a negative electrolyte inlet 64 of the cell stack 6 through the circulation pump 5 via the liquid delivery pipeline 1. A negative electrolyte outlet 62 of the cell stack 6 is connected with the positive electrolyte storage tank 3 and the negative electrolyte storage tank 4 respectively via the liquid delivery pipeline 1. Specifically, a feeding hole 7 through which the capacity recovery agent is added may be respectively provided in the positive electrolyte storage tank 3 and the negative electrolyte storage tank 4. In addition, an electric valve 2 for opening or closing the respective liquid delivery pipeline 1 is respectively provided on the liquid delivery pipeline 1 between the positive electrolyte outlet 61 of the cell stack 6 and the positive electrolyte storage tank 3, on the liquid delivery pipeline 1 between the positive electrolyte outlet 61 of the cell stack 6 and the negative electrolyte storage tank 4, on the liquid delivery pipeline 1 between the negative electrolyte outlet 62 of the cell stack 6 and the positive electrolyte storage tank 3, and on the liquid delivery pipeline 1 between the negative electrolyte outlet 62 of the cell stack 6 and the negative electrolyte storage tank 4. In actual applications, the first control unit realizes adjustment of the liquid levels of the positive electrolyte and the negative electrolyte by controlling operating states of the electric valves 2. Here, the first preset decay rate may be in a range from 3% to 10%; the second preset decay rate may be in a range from 5% to 20%; the preset value may be in a range from 0.05 m to 0.2 m; the first preset ratio may be in a range of 1:1.5 to 1:1.2; the first preset ratio may be in a range of 1:1.5 to 1:1.2. According to the present disclosure, when the current electrolyte capacity decay rate of the flow battery is greater than or equal to the second preset decay rate, an operation of adding a required amount of the volume recovery agent to the positive electrolyte storage tank 3 and the negative electrolyte storage tank 4 is performed, wherein the use amount of the required amount of the volume recovery agent may be calculated according to the current electrolyte capacity decay rate of the flow battery and the volumes of the positive electrolyte and the negative electrolyte. Specifically, assuming that the current electrolyte capacity decay rate is $R_0$, the volume of the electrolyte in the positive electrolyte storage tank 3 is $L_1$, and the volume of the electrolyte in the negative electrolyte storage tank 4 is $L_2$, the use amount of the capacity recovery agent required to be added is $$H = \frac{Z*(L_1+L_2)*R_0*M}{\frac{2}{n_0}},$$

wherein Z is the molecular weight of the capacity recovery agent, M is the total vanadium concentration (for a whole-vanadium flow battery, M can be 1.65 mol/L), and no represents that 1 mol of reducing agent reduces n mol of $V^{5+}$. The capacity recovery agent can be specifically added through the feeding holes 7 provided in the positive electrolyte storage tank 3 and the negative electrolyte storage tank 4. In actual applications, the capacity recovery agent can be added by an automatic feeder. The capacity recovery agent is at least one of CxHyOz organic molecules containing at least one hydroxyl group, wherein $1 \leq x \leq 12$, $2 \leq y \leq 12$, $1 \leq z \leq 12$. Specifically, CxHyOz may be an alcohol, an acid, and a saccharide depending on a molecular functional group. Specifically, when CxHyOz is the alcohol: $1 \leq x \leq 3$, $4 \leq y \leq 8$, $1 \leq z \leq 3$. Specifically, when x=3, y=8, and z=3, the capacity recovery agent is glycerol. When CxHyOz is the acid: $1 \leq x \leq 6$, $2 \leq y \leq 8$, $2 \leq z \leq 7$. Specifically, when x=6, y=8, and z=7, the capacity recovery agent is citric acid. When CxHyOz is the saccharide, x=6 or 12, y=12, z=6 or 12. Specifically, when x=6, y=12, and z=6, the capacity recovery agent is fructose.

In the present disclosure, the operating state parameters of the flow battery refer to SOC (State of Charge) and/or a positive and negative liquid level difference, i.e., a difference between liquid levels of the electrolyte in the positive electrolyte storage tank and the electrolyte in the negative electrolyte storage tank. The steps of determining a corresponding relationship between the operating state parameter of the flow battery and the electrolyte capacity decay rate is specifically described below when the operating state parameter of the flow battery is SOC: first, obtaining the initial state of charge $SOC_0$ (SOC before the flow battery is subjected to charging and discharging experiments, and the initial SOC may generally be 100% or 0%); then performing continuous charging and discharging experiments on the flow battery at a rated power, stopping charging and discharging under different SOC states during the charging and discharging experiments, sampling the positive electrolyte and the negative electrolyte respectively for a plurality of times, and meanwhile acquiring vanadium ion concentrations of the sampled positive electrolyte and negative electrolyte; calculating the corresponding electrolyte capacity decay rate R according to the acquired vanadium ion concentration conditions of the positive electrolyte and the negative electrolyte; and further obtaining a corresponding relationship between different SOCs and the electrolyte capacity decay rate during the charging and discharging experiments. Specifically, the electrolyte capacity decay rate $R=(x_i-SOC_0)/(1-SOC_0)$ can be obtained, where xi is SOCs (different SOCs at the time of stopping charging and discharging experiments for a plurality of times) corresponding to different sampling moments i of the electrolyte. The steps of determining a corresponding relationship between the operating state parameter of the flow battery and the electrolyte capacity decay rate is specifically described below when the operating state parameter of the flow battery is the positive and negative liquid level difference: first, obtaining an initial liquid level $L_0$ of the electrolyte in the positive electrolyte storage tank and the electrolyte in the negative electrolyte storage tank; then performing continuous charging and discharging experiments on the flow battery at a rated power, and acquiring different positive and negative liquid level differences during the charging and discharging experiments; sampling the positive electrolyte and the negative electrolyte respectively for a plurality of times according to the changes of the positive and negative liquid level differences during the charging and discharging experiments, and acquiring vanadium ion concentrations of the sampled positive electrolyte and negative electrolyte; calculating the corresponding electrolyte capacity decay rate R according to the acquired vanadium ion concentration conditions of the positive electrolyte and the negative electrolyte; and further obtaining a corresponding relationship between different positive and negative liquid level differences and the electrolyte capacity decay rate through the charging and discharging experiments. Specifically, the electrolyte capacity decay rate $R=y_i/2L_0$ can be obtained, where yi is the corresponding positive and negative liquid level differences corresponding to different sampling moments i of the electrolyte. The steps of determining a corresponding relationship between the operating state parameter of the flow battery and the electrolyte capacity decay rate is specifically described below when the operating state parameters of the flow battery are SOC and positive and negative liquid level difference: first, obtaining the initial state of charge $SOC_0$ (SOC before the flow battery is subjected to charging and discharging experiments, and the initial SOC may generally be 100% or 0%), and an initial liquid level $L_0$ of the electrolyte in the positive electrolyte storage tank and the electrolyte in the negative electrolyte storage tank; then performing continuous charging and discharging experiments on the flow battery at a rated power, stopping charging and discharging under different SOC states in the charging and discharging experiments and obtaining the positive and negative liquid level difference in the course of stopping charging and discharging at the same time, sampling the positive electrolyte and the negative electrolyte respectively for a plurality of times, and acquiring vanadium ion concentrations of the sampled positive electrolyte and negative electrolyte; calculating the corresponding electrolyte capacity decay rate R according to the acquired vanadium ion concentration conditions of the positive electrolyte and the negative electrolyte; and further obtaining a corresponding relationship between different SOCs and the electrolyte capacity decay rate as well as different positive and negative liquid level differences and the electrolyte capacity decay rate during the charging and discharging experiments. Specifically, the electrolyte capacity decay rate $R=(x_i-SOC_0)/(1-SOC_0)+y_i/2L_0$ can be obtained, where xi is SOCs (different SOCs at the time of stopping charging and discharging experiments for a plurality of times) corresponding to different sampling moments i of the electrolyte, and yi is the corresponding positive and negative liquid level differences corresponding to different sampling moments i of the electrolyte. The initial $SOC_0$ mentioned here and different SOCs during the charging and discharging experiments can be directly obtained by an SOC detection device, or indirectly obtained by an SOC monitoring system in the patent application document (Application No: 201410613631.0), titled "Method and System for Monitoring State of Charge of Flow Battery System", filed by the applicant on Nov. 3, 2014. In the present disclosure, the capacity decay degree can be monitored and controlled on line; the capacity decay condition of the flow battery at any moment and under any state can be acquired; the electrolyte sampling and analysis steps in the flow battery project site are omitted, such that the operation is convenient and the practicability is high, and the manpower, material resources and financial resources at the operation and maintenance phases of the flow battery are greatly saved.

Figure 9:
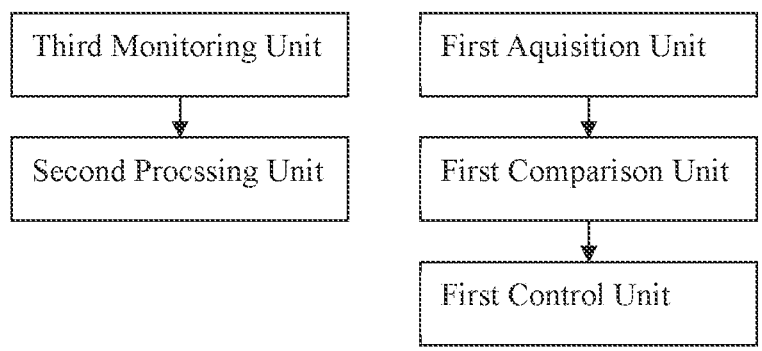
FIG. 9 is a structural block diagram of a flow battery control system according to Embodiment 2 of the present disclosure.
Figure 10:
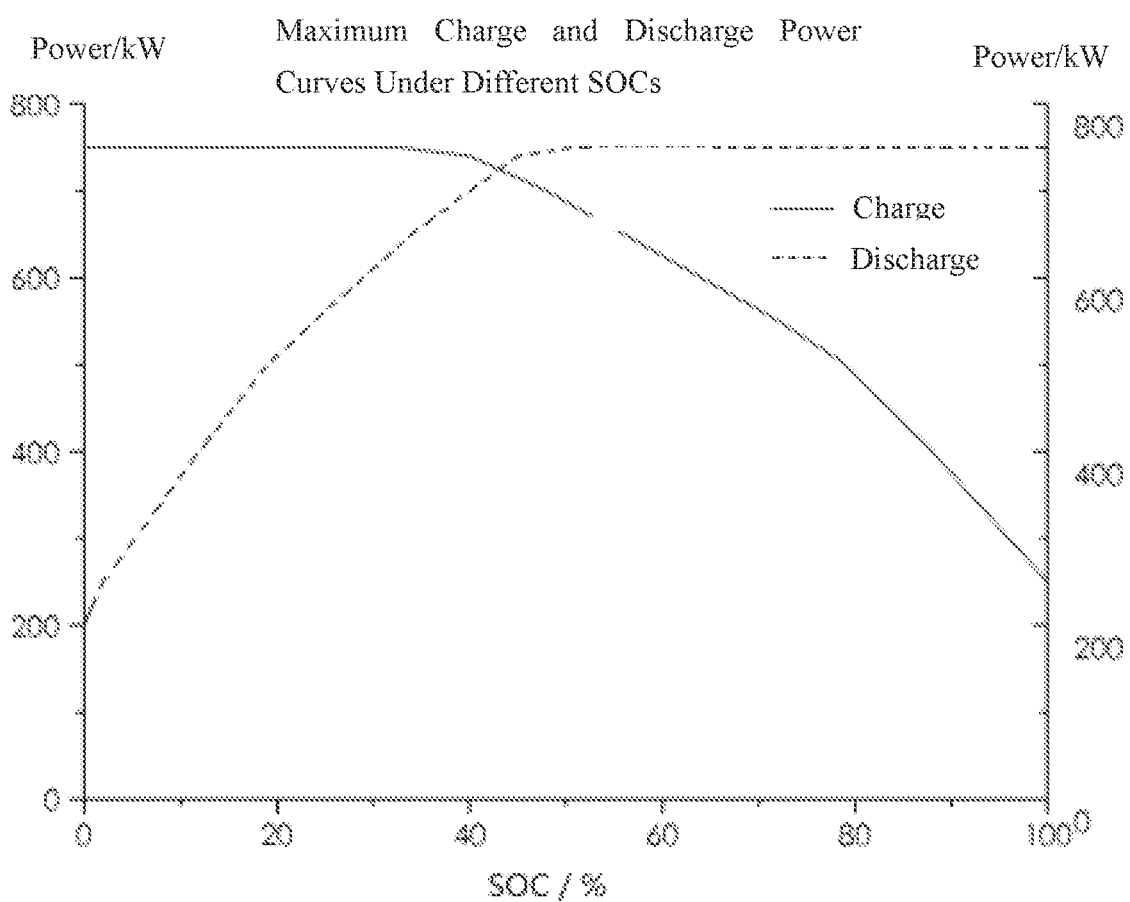
FIG. 10 is an example diagram showing a corresponding relationship between the SOC of the flow battery of the present disclosure and the maximum chargeable power value of the flow battery, and a corresponding relationship between the SOC of the flow battery and the maximum dischargeable power value of the flow battery.

FIG. 9 is a structural block diagram of a flow battery control system according to Embodiment 2 of the present disclosure. This embodiment is a preferred embodiment which is improved on the basis of Embodiment 1. As shown in FIG. 9, the control system further comprises a third monitoring unit configured to detect SOC of the flow battery; and a second processing unit connected with the third monitoring unit and configured to obtain a maximum chargeable power value of the flow battery or a maximum dischargeable power value of the flow battery under the current SOC according to the detected SOC of the flow battery and in combination with a corresponding relationship among the SOC of the flow battery, the maximum chargeable power value of the flow battery and the maximum dischargeable power value of the flow battery. According to the present disclosure, the corresponding relationship among the SOC of the flow battery, the maximum chargeable power value of the flow battery and the maximum dischargeable power value of the flow battery is stored in advance. The corresponding relationship between the SOC of the flow battery and the maximum chargeable power value of the flow battery can be derived according to the following process: assuming that the maximum charge power designed for the flow battery is P0, and the flow battery is discharged to SOC=0%, then charged to a voltage upper limit at the designed maximum charge power P0, and charged to SOC=100% at a constant voltage, wherein the maximum charge power reduces gradually in the constant-voltage charging process, and in this charging process, the corresponding relationship between the SOC of the flow battery and the maximum chargeable power value of the flow battery is derived by taking SOC as x and the charge power as y. FIG. 10 illustrates an example diagram of a corresponding relationship between the SOC of the flow battery of the present disclosure and the maximum chargeable power value of the flow battery. The corresponding relationship between the SOC of the flow battery and the maximum dischargeable power value of the flow battery can be derived according to the following process: assuming that the maximum discharge power designed for the flow battery is P1, and the flow battery is discharged to SOC=100% at a constant power, then discharged to a voltage lower limit at the designed maximum charge power P1, and discharged to SOC=0% at a constant voltage, wherein the maximum discharge power increases gradually in the constant-voltage discharging process, and in this discharging process, the corresponding relationship between the maximum discharge power and the SOC is derived by taking SOC as x and the discharge power as z. FIG. 10 illustrates an example diagram of a corresponding relationship between the SOC of the flow battery of the present disclosure and a maximum dischargeable power value of the flow battery. It can be derived by summarizing the two results that 0% and 100% of the flow battery correspond to the maximum chargeable power value and the maximum rechargeable power value respectively. The second processing unit, after obtaining the maximum chargeable power value of the flow battery or the maximum dischargeable power value of the flow battery under the current SOC, can upload the maximum chargeable power value or the maximum dischargeable power value of the flow battery to an energy management system, and further the energy management system or an energy storage power station monitoring system can perform power scheduling according to the maximum chargeable power value of the flow battery or the maximum dischargeable power value of the flow battery, thereby facilitating planned power generation of a power grid and providing reference for transient power emergency response.

Figure 11:
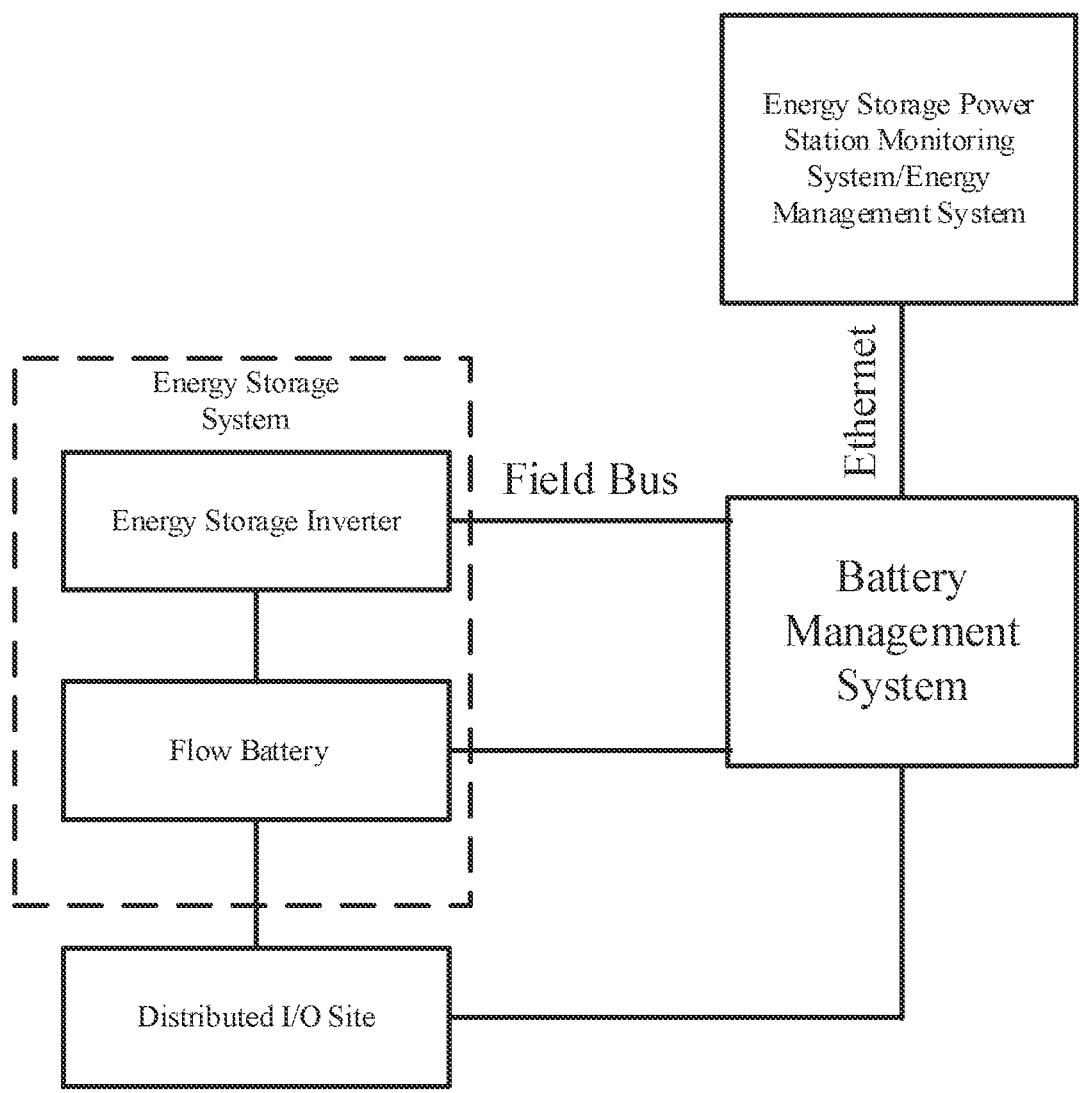
FIG. 11 is a structural block diagram of a flow battery control system according to Embodiment 3 of the present disclosure.
Figure 12:
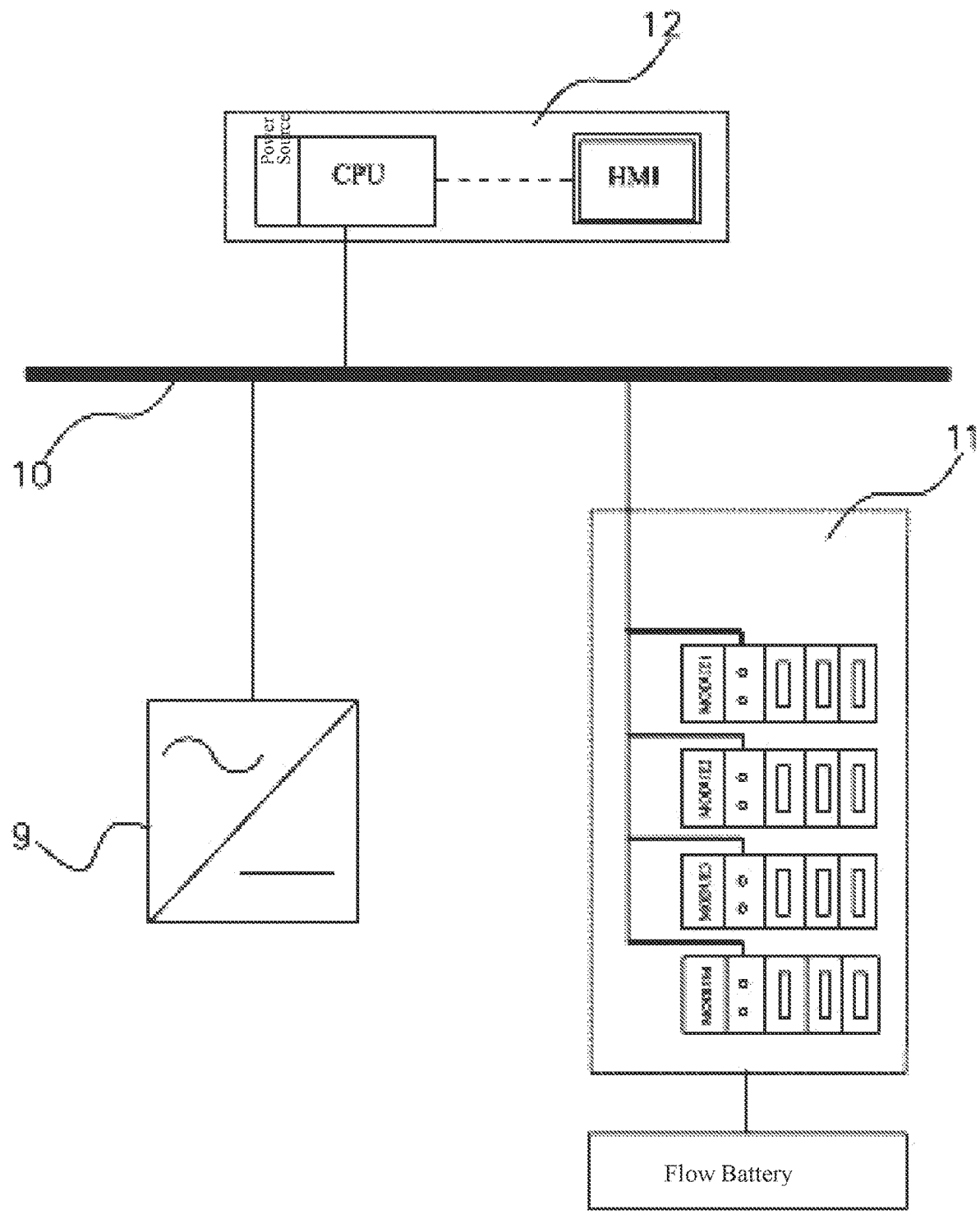
FIG. 12 is a structural block diagram of a flow battery control system according to Embodiment 3 of the present disclosure.

FIG. 11 is a structural block diagram of a flow battery control system according to Embodiment 3 of the present disclosure. FIG. 12 is a structural schematic diagram of the flow battery control system according to Embodiment 3 of the present disclosure. This embodiment is a preferred embodiment which is further improved on the basis of Embodiment 1. As shown in FIG. 11 and FIG. 12, preferably, the control system further comprises: an energy storage inverter 9 and a battery management system 12 which are connected with the flow battery, wherein the flow battery and the energy storage inverter 9 form an energy storage system, the battery management system 12 is connected with the energy storage inverter 9 via a field bus 10, and the energy storage inverter 9 transmits power grid parameters at the AC side and the operating parameters of the energy storage inverter 9 to the battery management system 12 via the field bus 10, and simultaneously receives operation and control signals of the energy storage inverter 9 from the battery management system 12; an energy storage power monitoring system or an energy management system connected with the battery management system 12, wherein the battery management system 12 uploads power grid parameters at the AC side of the energy storage inverter 9, operating parameters of the energy storage inverter 9, and operating parameters of the flow battery to the energy storage power station monitoring system or the energy management system and receives an electric energy scheduling instruction for the energy storage system from the energy storage power station monitoring system or the energy management system; and a distributed I/O site 11 disposed in the flow battery on site, wherein the battery management system 12 acquires operating parameters of the flow battery through the distributed I/O site 11. Preferably, the battery management system 12 adjusts an operating state of the energy storage inverter 9 according to the acquired operating parameters of the flow battery. When the operating parameters of the flow battery are abnormal, the battery management system 12 controls the energy storage inverter 9 to stop operating. The operating parameters of the flow battery at least include a voltage of the flow battery. When the voltage of the flow battery is higher than a first voltage limit value or lower than a second voltage limit value, the battery management system controls the energy storage inverter 9 to change an operating mode from a constant power mode to a constant voltage mode. By taking a 500 kW flow battery as an example, the first voltage limit value may be 806V; the second voltage limit value may be 520V. The battery management system 12 and the energy storage power station monitoring system or the energy management system may be connected via Ethernet. Here, the power grid parameters of the AC side and the operating parameter of the energy storage inverter 9 are operating data of the energy storage inverter 9. Here, the operation and control signals of the energy storage inverter 9 are control data of the energy storage inverter 9, which are output by the battery management system 12 in order to control the operating state of the energy storage inverter 9.

The battery management system 12 of the present disclosure manages the flow battery and the energy storage inverter 9 at the same time, coordinates the relationship therebetween, reduces the response time of the energy storage system, and optimizes a flow battery control strategy. The operating parameters of the flow battery at least include: electrolyte flow rate, electrolyte pressure, electrolyte temperature, flow battery voltage, flow battery current and flow battery SOC, all of which can be output through a plurality of signal sensors, signal transmitters and some signal conversion modules connected to each flow battery. The operation and control signals of the energy storage inverter 9 at least includes an operating mode control signal of the energy storage inverter 9, and charging and discharging parameter setting signals such as active power setting, reactive power setting, DC voltage setting, DC current setting, alarm and fault resetting, an energy storage inverter 9 operation stop signal, etc. The power grid parameters of the AC side of the energy storage inverter 9 include voltage, current, frequency, active power, reactive power, power factor, daily charge and discharge capacities, and total charge and discharge capacities of the AC grid side. The operating parameters of the energy storage inverter 9 include voltage, current, power, operating mode, operating state, alarm and faulty state, etc. at the DC side. In this embodiment, the distributed I/O site 11 is disposed near the flow battery on site, which effectively reduces physical connection lines between the remote management system and the flow battery on site and connection points of signal cables, such that the signal transmission is not easily interfered, and at the same time the wiring time and engineering cost are reduced, the wiring operation is flexible and convenient, the cost is saved, the on-site debugging and operation are convenient, and the later maintenance is easier. When the operating parameters of the flow battery are abnormal, the battery management system 12 directly stops the energy storage inverter 9, thereby avoiding battery overcharging caused by continuous charging of the energy storage inverter 9 from happening after the flow battery is powered off because of abnormal operating parameters. The self controls of the energy storage inverter 9 and the flow battery are organically combined together, thereby not only taking the synchronization and coordination thereof into consideration, and but also taking the response time and safety reliability of the energy storage system into account.

Figure 13:
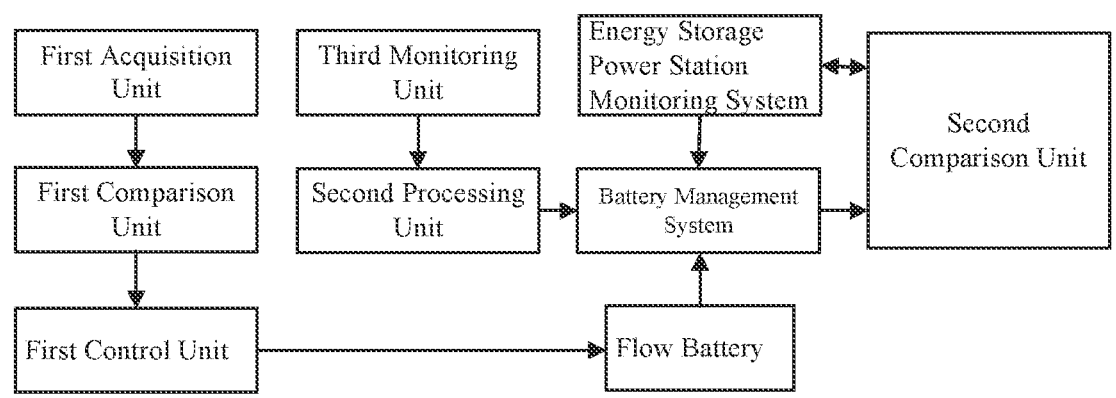
FIG. 13 is a structural block diagram of a flow battery control system according to Embodiment 4 of the present disclosure.

FIG. 13 is a structural block diagram of a flow battery control system according to Embodiment 4 of the present disclosure. As shown in FIG. 13, this embodiment is a preferred embodiment which is further improved on the basis of Embodiment 1. Preferably, the control system further comprises: a battery management system connected with the flow battery and configured to acquire a current maximum chargeable power value or maximum dischargeable power value, and upload the acquired maximum chargeable power value or maximum dischargeable power value to the energy storage power station monitoring system or the energy management system; an energy storage power station monitoring system or energy management system connected with the battery management system and configured to issue an electric energy scheduling instruction to the battery management system; a second comparison unit connected with the energy storage power station monitoring system or the energy management system and the battery management system and configured to compare a scheduling power value included in the electric energy scheduling instruction with the maximum chargeable power value or the maximum dischargeable power value before the energy storage power station monitoring system or the energy management system issues the electric energy scheduling instruction, wherein the energy storage power station monitoring system or the energy management system issues the electric energy scheduling instruction directly to the battery management system when the maximum chargeable power value or the maximum dischargeable power value is greater than the scheduling power value; the energy storage power station monitoring system or the energy management system adjusts the scheduling power value included in the electric energy scheduling instruction to be equal to the maximum chargeable power value or the maximum dischargeable power value when the maximum chargeable power value or the maximum dischargeable power value is less than or equal to the scheduling power value, and then issues the electric energy scheduling instruction to the battery management system. Further, the battery management system may acquire the current maximum chargeable power value or maximum dischargeable power value of the flow battery by using the second processing unit in the Embodiment 2. In this embodiment, the energy management system or the energy storage power station monitoring system may perform power scheduling according to the maximum chargeable power value of the flow battery or the maximum dischargeable power value of the flow battery, thereby facilitating planned power generation of a power grid and providing reference for transient power emergency response, and realizing planned power generation of an energy storage power station or a frequency modulation function.

Figure 14:
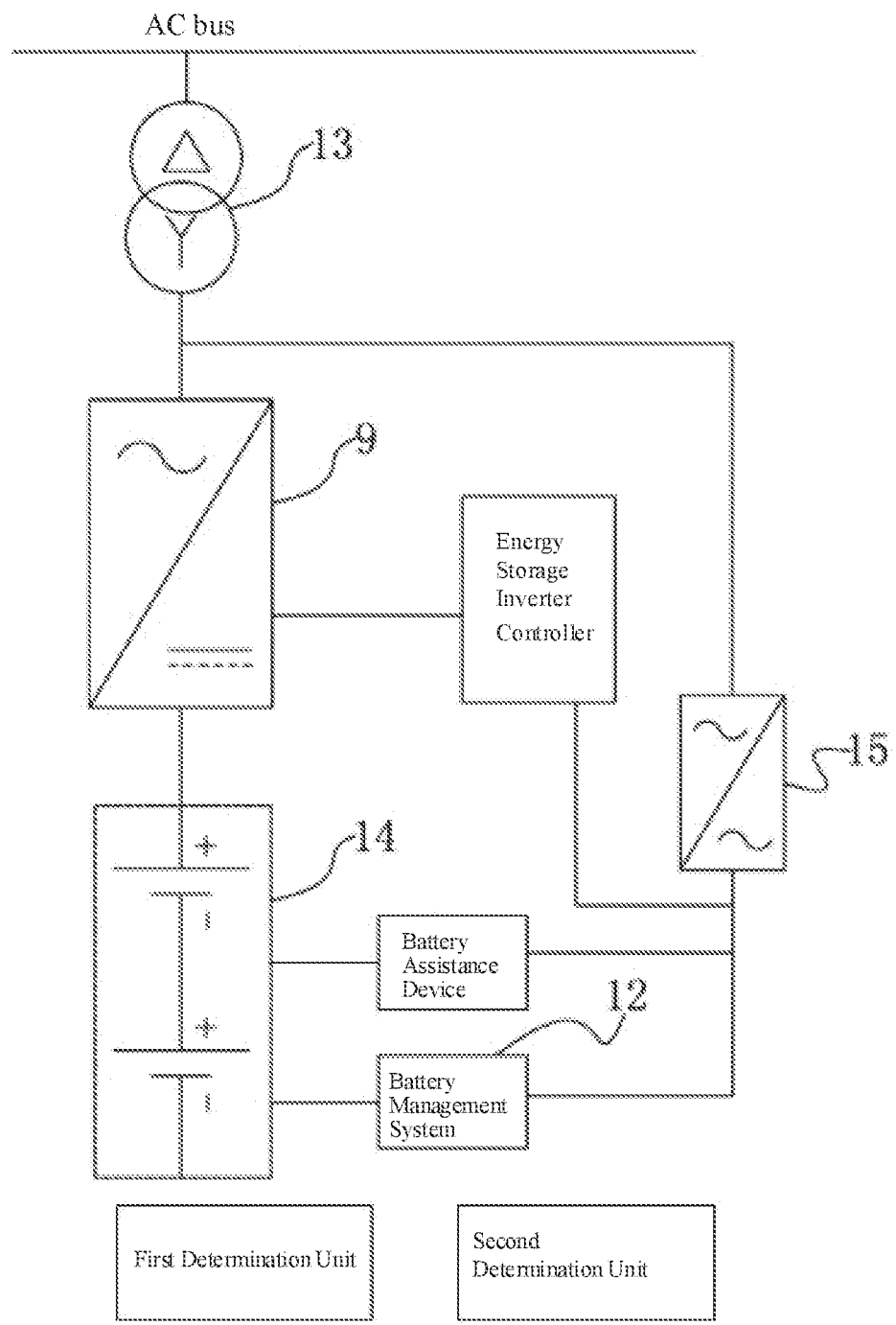
FIG. 14 is a structural block diagram of a flow battery control system according to Embodiment 5 of the present disclosure.

FIG. 14 is a structural schematic diagram of a flow battery control system according to Embodiment 5 of the present disclosure. This embodiment is a preferred embodiment which is further improved on the basis of Embodiment 1. As shown in FIG. 14, the flow battery comprises a flow battery body 14, and a battery assistance device and a battery management system 12 which are connected with the flow battery body 14; the flow battery body 14 is connected with a DC side of the energy storage inverter 9; an energy storage inverter 9 controller is connected to the energy storage inverter 9; the energy storage inverter 9 is connected with an AC bus; a UPS 15 is also connected to an AC side of the energy storage inverter 9; an output end of the UPS 15 is connected with the battery management system 12 and the battery assistance device. The control system further comprises: a first determination unit configured to determine whether a power grid is able to supply electric power normally; when the power grid is not able to supply electric power normally, the UPS 15, serving as a starting power source of the flow battery body 14, outputs electric energy to supply electric power to the battery assistance device, the battery management system 12 and the energy storage inverter 9; and a second determination unit configured to determine whether a voltage of the flow battery body 14 satisfies a minimum operating voltage of the energy storage inverter 9 after the UPS 15 serves as the starting power source of the flow battery body 14; when the voltage of the flow battery body 14 satisfies the minimum operating voltage of the energy storage inverter 9, the energy storage inverter 9 controller controls the energy storage inverter 9 to enter a V/F control mode, wherein the energy storage inverter 9 adjusts an output voltage so that a voltage of the AC bus satisfies specified electric energy quality requirements, and the UPS 15 enters a bypass mode; when the power grid is able to supply electric power normally and after the flow battery is powered off, the energy storage inverter 9 controller controls the energy storage inverter 9 to release the remaining electric energy in the flow battery body 14 to the UPS 15. In this embodiment, after the flow battery is powered off, the remaining electric energy stored in the flow battery body 14 is released to the UPS 15 by controlling the energy storage inverter 9. The discharge power at this time is equal to the rated power of the UPS 15, and the discharge time depends on the chargeable capacity of the UPS 15. Since the time by which the flow battery body 14 starts and establishes a voltage is very short, the capacity of the UPS 15 does not need to be large. Specifically, the capacity value of the UPS 15 can be adjusted according to the time required for the flow battery body 14 to be initiated. The time required for the flow battery body 14 to be initiated refers to the time from when the circulation pump is initiated until an output voltage of the flow battery body 14 reaches a minimum operating voltage of the energy storage inverter 9. This time is up to 2 minutes. When the power grid is not able to supply power normally, the time that the flow battery is kept working is proportional to its capacity, and the flow battery can be fully utilized to improve the efficiency and utilization of the battery. The AC side of the energy storage inverter 9 adopts a three-phase five-wire system. The AC bus is a 35 kV bus. The energy storage inverter 9 and the AC bus may also be connected via a transformer 13. Specifically, the transformer 13 has a capacity of 800 kVA, a rated voltage of 35±2*2.5%/0.380 kV, and a connection group number: D, y11; the energy storage inverter 9 has a capacity of 750 kVA and an AC side voltage of 380 V; the flow battery body 14 has a power of 500 kW and a voltage range 520 to 806V; the UPS 15 has a capacity of 10 kVA, a backup time of 5 minutes and an operating mode of backup. The flow battery body 14 comprises a cell stack, a positive electrolyte storage tank, a negative electrolyte storage tank and an electrolyte circulation pipe. The battery assistance device is an essential device for maintaining the circulation of electrolyte and at least comprises a circulation pump and an electric valve on the electrolyte circulation pipeline; and at least one of the UPS 15, a flow battery heat dissipation device and a flow battery electric-heating device. The specified power quality requirements may be the requirements that meet the power quality standards stipulated by China's national standards for power quality, such as "GB/T 12325-2008 Power Quality Supply Voltage Deviation" and "GB/T 14549-1993 Power Quality Utility Grid Harmonics", or the requirements that meet the power quality standards stipulated by other countries' national standards for power quality. In practical applications, the minimum operating voltage of the energy storage inverter 9 may be in a range from 480 to 520V. In this embodiment, when the power grid is normal, the UPS 15 is charged after the flow battery is powered off, such that the battery efficiency is improved. The UPS 15 has a small capacity, and therefore the cost is saved. Since the AC input side of the UPS 15 is connected to the AC side of the energy storage inverter 9, the capacity of the battery can be fully utilized when the power grid is disconnected.

Figure 15:
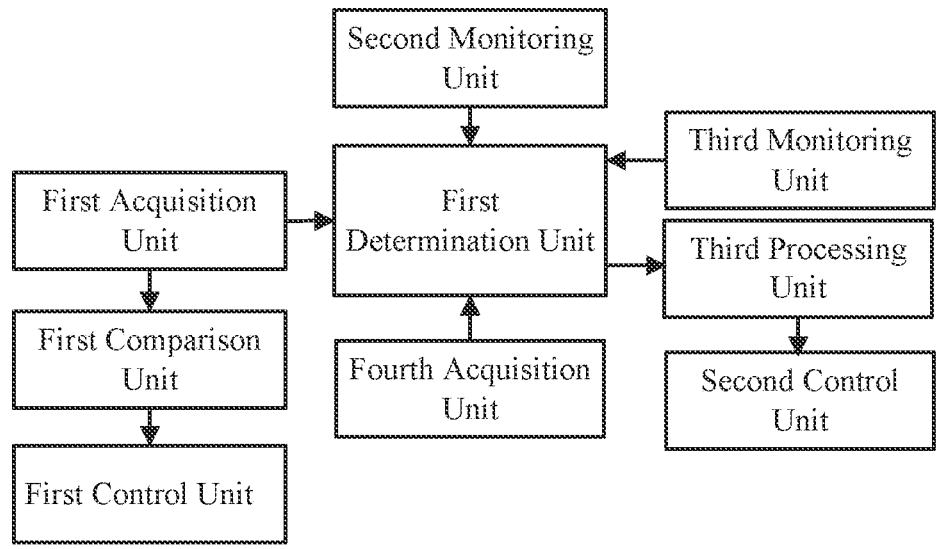
FIG. 15 is a structural block diagram of a flow battery control system according to Embodiment 6 of the present disclosure.

FIG. 15 is a structural block diagram of a flow battery control system according to Embodiment 6 of the present disclosure. This embodiment is a preferred embodiment which is further improved on the basis of Embodiment 1. As shown in FIG. 15, the control system further comprises: a second monitoring unit configured to detect an electrolyte temperature; a third monitoring unit configured to detect SOC of the flow battery; a fourth acquisition unit configured to acquire a current charge power or discharge power of the flow battery; a first determination unit connected with the second monitoring unit, the third monitoring unit, the fourth acquisition unit and the first acquisition unit and configured to determine an electrolyte temperature range to which the current electrolyte temperature of the flow battery belongs, an SOC range to which the current SOC belongs, a charge power range to which the current charge power belongs or a discharge power range to which the current discharge power belongs, and a capacity decay rate range to which the current electrolyte capacity decay rate belongs; a third processing unit connected with the first determination unit and configured to obtain an optimal electrolyte flow rate parameter according to the determined electrolyte temperature range, SOC range, charge power range or discharge power range and capacity decay rate range, and in combination with a corresponding relationship among the electrolyte temperature range, the SOC range, the charge power range, the capacity decay rate range and an optimal electrolyte flow rate, or in combination with a corresponding relationship among the electrolyte temperature range, the SOC range, the discharge power range, the capacity decay rate range and the optimal electrolyte flow rate; and a second control unit connected with the third processing unit and configured to adjust the current electrolyte flow rate of the flow battery to obtain the optimal electrolyte flow rate. Specifically, the corresponding relationship among the electrolyte temperature range, the SOC range, the charge power range, the capacity decay rate range and the optimal electrolyte flow rate, and the corresponding relationship among the electrolyte temperature range, the SOC range, the discharge power range, the capacity decay rate range and the optimal electrolyte flow rate are determined and stored in advance.

Specifically, the electrolyte temperature may be divided in ranges according to 1 to 50° C. The SOC range may be divided in ranges according to 1 to 50%. The charge power or the discharge power may be divided in ranges according to 20 to 125 kW. The capacity decay rate may be divided in ranges according to 5 to 15%. The specific determination process of the corresponding relationship among the electrolyte temperature range, the SOC range, the charge power range, the capacity decay rate range and the optimal electrolyte flow rate is as follows: performing charging experiments respectively under different electrolyte temperature ranges, SOC ranges, capacity decay rate ranges, and charge power ranges to determine the optimal electrolyte flow rate under the corresponding conditions. The optimal electrolyte flow rate under each electrolyte temperature range, SOC range, capacity decay rate range, and charge power range is obtained by setting different electrolyte flow rates under the electrolyte temperature range, the SOC range, the capacity decay rate range, and the charge power range, such that the electrolyte flow rate corresponding to the charging experiment in which the energy efficiency and the electrolyte utilization rate are optimal is the optimal electrolyte flow rate. The specific determination process of the corresponding relationship among the electrolyte temperature range, the SOC range, the discharge power range, the capacity decay rate range, and the optimal electrolyte flow rate is as follows: performing discharging experiments respectively under different electrolyte temperature ranges, SOC ranges, capacity decay rate ranges, and discharge power ranges to determine the optimal electrolyte flow rate under the corresponding conditions. The optimal electrolyte flow rate under each electrolyte temperature range, SOC range, capacity decay rate range, and discharge power range is obtained by setting different electrolyte flow rates under the electrolyte temperature range, the SOC range, the capacity decay rate range, and the discharge power range, such that the electrolyte flow rate corresponding to the discharging experiment in which the energy efficiency and the electrolyte utilization rate are optimal is the optimal electrolyte flow rate.

Specifically, the corresponding relationship between the electrolyte flow rate and the electrolyte temperature range, the SOC range, the capacity decay rate range, and the charge power range or the discharge power range is as shown in Table 1, wherein [T1, T2], [T2, T3] are examples of the electrolyte temperature range; [SOC1, SOC2], [SOC2, SOC3], and [SOC3, SOC4] are examples of the SOC range; [R1, R2], [R2, R3] are examples of the capacity decay rate range. [P1, P2], [P2, P3], and [P3, P4] are examples of the charge power range or the discharge power range; F1 to F18 are examples of the electrolyte flow rate.

TABLE 1

Example Table of Corresponding Relationship Between Electrolyte Flow Rate, Electrolyte Temperature Range, SOC Range, Capacity Decay Rate Range, and Charge Power Range or Discharge Power Range

|  |  |  | [P1, P2] | [P2, P3] | [P3, P4] |
|---|---|---|---|---|---|
| [T1, T2] | [SOC1, SOC2] | [R1, R2] | F1 | F2 | F3 |
|  |  | [R2, R3] | F4 | F5 | F6 |
|  | [SOC2, SOC3] | [R1, R2] | F7 | F8 | F9 |
|  |  | [R2, R3] | F10 | F11 | F12 |
|  | [SOC3, SOC4] | [R1, R2] | F13 | F14 | F15 |
|  |  | [R2, R3] | F16 | F17 | F18 |
| [T2, T3] | [SOC1, SOC2] | [R1, R2] | F19 | F20 | F21 |
|  |  | [R2, R3] | F22 | F23 | F24 |
|  | [SOC2, SOC3] | [R1, R2] | F25 | F26 | F27 |
|  |  | [R2, R3] | F28 | F29 | F30 |
|  | [SOC3, SOC4] | [R1, R2] | F31 | F32 | F33 |
|  |  | [R2, R3] | F34 | F35 | F36 |

Since the demands of different electrolyte temperatures, SOCs, capacity decay rates, and charge and discharge powers on reactants of the electrolyte are different during the operation of the flow battery, in this embodiment of the present disclosure, corresponding electrolyte flow rates can be controlled according to different operating state parameters of the flow battery, continuous operation of the flow battery under an optimal condition can be ensured, the flow rate requirements of the flow battery can be satisfied, and the power consumption of the circulation pump can be reduced.

Figure 16:
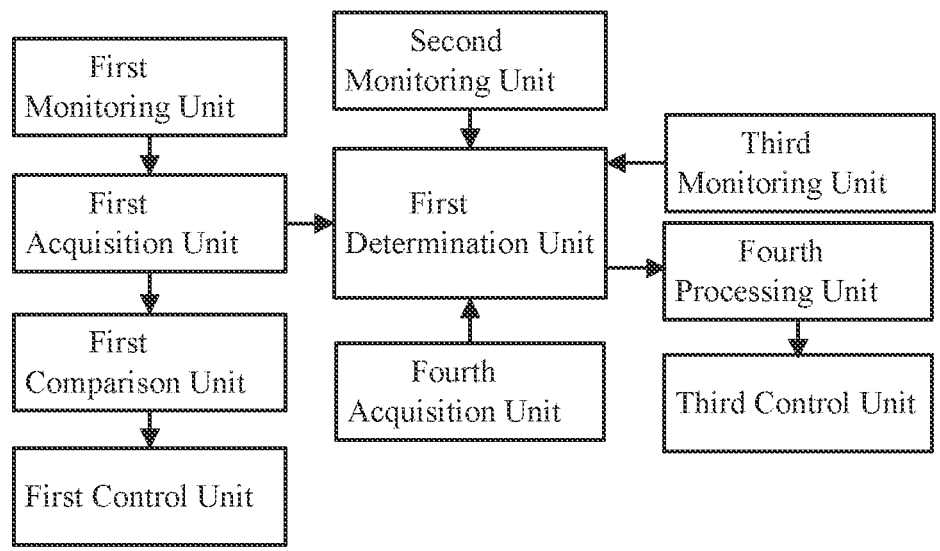
FIG. 16 is a structural block diagram of a flow battery control system according to Embodiment 7 of the present disclosure.

FIG. 16 is a structural block diagram of a flow battery control system according to Embodiment 7 of the present disclosure. This embodiment is a preferred embodiment which is further improved on the basis of Embodiment 1. As shown in FIG. 16, the control system further comprises: a second monitoring unit configured to detect an electrolyte temperature; a third monitoring unit configured to detect SOC of the flow battery; a fourth acquisition unit configured to acquire a current charge power or discharge power of the flow battery; a first determination unit connected with the second monitoring unit, the third monitoring unit, the fourth acquisition unit and the first acquisition unit and configured to determine an electrolyte temperature range to which the current electrolyte temperature of the flow battery belongs, an SOC range to which the current SOC belongs, a charge power range to which the current charge power belongs or a discharge power range to which the current discharge power belongs, and a capacity decay rate range to which the current electrolyte capacity decay rate belongs; a fourth processing unit connected with the first determination unit and configured to obtain a parameter of an optimal difference between volumes of positive electrolyte and negative electrolyte according to the determined electrolyte temperature range, SOC range, charge power range or discharge power range and capacity decay rate range, and in combination with a corresponding relationship among the electrolyte temperature range, the SOC range, the charge power range, the capacity decay rate range and an optimal difference between volumes of the positive electrolyte and the negative electrolyte, or in combination with a corresponding relationship among the electrolyte temperature range, the SOC range, the discharge power range, the capacity decay rate range and the optimal difference between volumes of the positive electrolyte and the negative electrolyte; and a third control unit connected with the fourth processing unit and configured to adjust the current difference between the volumes of the positive electrolyte and the negative electrolyte of the flow battery to obtain the optimal difference between volumes of the positive electrolyte and the negative electrolyte. The corresponding relationship among the electrolyte temperature range, the SOC range, the charge power range, the capacity decay rate range and the optimal difference between volumes of the positive electrolyte and the negative electrolyte, and the corresponding relationship among the electrolyte temperature range, the SOC range, the discharge power range, the capacity decay rate range and the optimal difference between volumes of the positive electrolyte and the negative electrolyte are determined and stored in advance. Specifically, the electrolyte temperature may be divided in ranges according to 1 to 50° C. The SOC range is divided in ranges according to 1 to 50%. The charge power or the discharge power may be divided in ranges according to 20 to 125 kW. The capacity decay rate may be divided in ranges according to 5 to 15%. The specific determination process of the corresponding relationship among the electrolyte temperature range, the SOC range, the charge power range, the capacity decay rate range and the optimal difference between volumes of the positive electrolyte and the negative electrolyte is as follows: performing charging experiments respectively under different electrolyte temperature ranges, SOC ranges, capacity decay rate ranges, and charge power ranges to determine the optimal difference between volumes of the positive electrolyte and the negative electrolyte under the corresponding conditions. The optimal difference between volumes of the positive electrolyte and the negative electrolyte under each electrolyte temperature range, SOC range, capacity decay rate range, and charge power range is obtained by setting different optimal differences between volumes of the positive electrolyte and the negative electrolyte (the difference between volume of the electrolyte in the positive electrolyte storage tank and the volume of the electrolyte in the negative electrolyte storage tank) under the electrolyte temperature range, the SOC range, the capacity decay rate range, and the charge power range, such that optimal difference between volumes of the positive electrolyte and the negative electrolyte corresponding to the charging experiment in which the energy efficiency and the electrolyte utilization rate are optimal is the optimal difference between volumes of the positive electrolyte and the negative electrolyte. The specific determination process of the corresponding relationship among the electrolyte temperature range, the SOC range, the discharge power range, the capacity decay rate range, and the optimal difference between volumes of the positive electrolyte and the negative electrolyte is as follows: performing discharging experiments respectively under different electrolyte temperature ranges, SOC ranges, capacity decay rate ranges, and discharge power ranges to determine the optimal difference between volumes of the positive electrolyte and the negative electrolyte under the corresponding conditions. The optimal difference between volumes of the positive electrolyte and the negative electrolyte under each electrolyte temperature range, SOC range, capacity decay rate range, and discharge power range is obtained by setting different optimal differences between volumes of the positive electrolyte and the negative electrolyte under the electrolyte temperature range, the SOC range, the capacity decay rate range, and the discharge power range, such that the optimal difference between volumes of the positive electrolyte and the negative electrolyte corresponding to the discharging experiment in which the energy efficiency and the electrolyte utilization rate are optimal is the optimal difference between volumes of the positive electrolyte and the negative electrolyte. Since the demands of different electrolyte temperatures, SOCs, capacity decay rates, and charge and discharge powers on reactants of the electrolyte are different during the operation of the flow battery, in this embodiment of the present disclosure, corresponding optimal difference between volumes of the positive electrolyte and the negative electrolyte can be controlled according to different operating state parameters of the flow battery, continuous operation of the flow battery under an optimal condition can be ensured, the flow rate requirements of the flow battery can be satisfied, and the power consumption of the circulation pump can be reduced.

Figure 17:
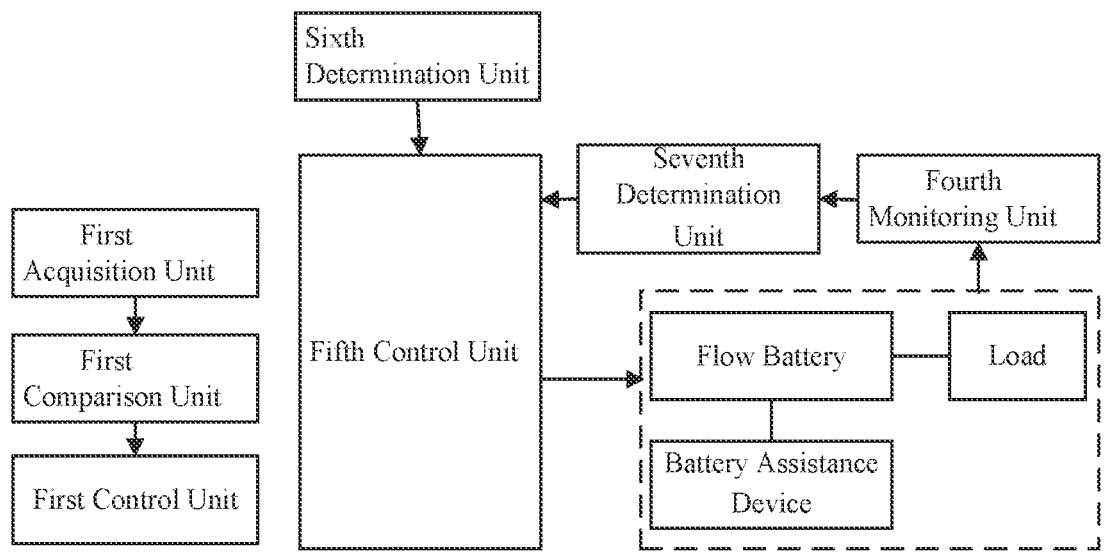
FIG. 17 is a structural block diagram of a flow battery control system according to Embodiment 8 of the present disclosure.
Figure 18:
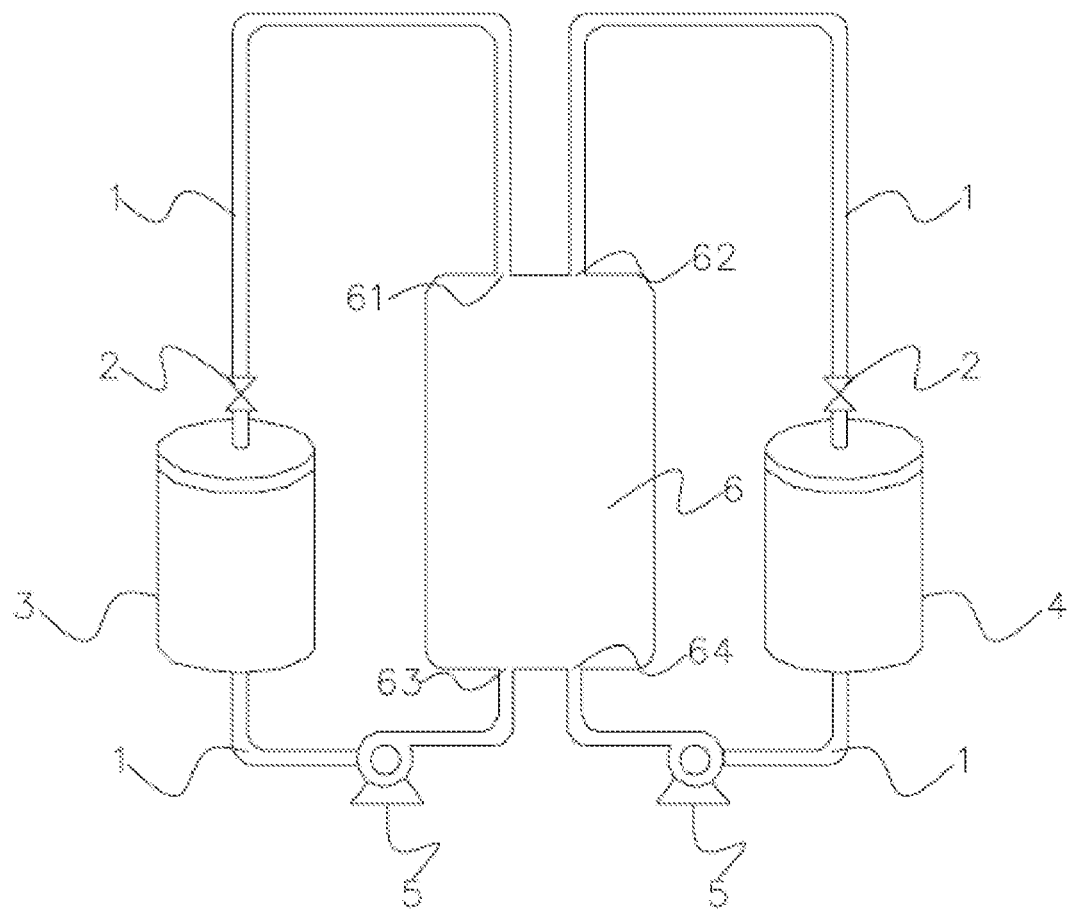
FIG. 18 is a structural schematic diagram of a flow battery in the prior art.

FIG. 17 is a structural block diagram of a flow battery control system according to Embodiment 8 of the present disclosure. This embodiment is a preferred embodiment which is further improved on the basis of Embodiment 1. As shown in FIG. 17, the control system further comprises: a sixth determination unit configured to determine whether the flow battery is powered off, a fifth control unit connected with the sixth determination unit and configured to control the flow battery to continue to supply electric energy to a load and/or the battery assistance device after the flow battery is powered off, wherein the load is a load which is connected when the flow battery operates normally; after the flow battery is powered off, if the flow battery does not supply electric energy to the load and/or the battery assistance device, the fifth control unit performs a forced electric leakage protection operation on the flow battery; a fourth monitoring unit configured to, after the flow battery is powered off, detect a discharge power of the flow battery when the flow battery continues to supply electric energy to the load and/or the battery assistance device; and a seventh determination unit connected with the fourth monitoring unit and configured to determine whether the discharge power of the flow battery reaches a discharge power threshold, wherein when the discharge power of the flow battery reaches the discharge power threshold, the fifth control unit performs the forced electric leakage protection operation on the flow battery or the control system stops working. The step of performing the forced electric leakage protection specifically refers to controlling the battery stacks of the flow battery to be disconnected from each other. After the flow battery system is powered off, a power off signal is sent to the sixth determination unit. After the flow battery is powered off, the circulation pump stops working, and the remaining electric energy in the battery stacks will be released by the load and/or the battery assistance device in this embodiment. The discharge power threshold is generally 5% to 100% of the rated power. When the discharge power threshold is reached, the battery stacks of the flow battery can be controlled to be disconnected to achieve further protection, or can be directly powered off when the discharge power threshold is reached. In this embodiment, the problems of damaging the battery stacks caused by the release of electrical energy in the battery stacks in the form of leakage current and shortening the life of the flow battery are avoided. The direct use of the load of the flow battery itself also solves the problem that more external auxiliary devices and systems required when the flow battery system is discharged by using external resistors are large-sized and complicated, and inconvenient for maintenance and repair. At the same time, after controlling the flow battery to discharge for the load, it is determined in real time whether the flow battery system is discharging for the load. When it is detected that the flow battery system does not perform a discharge operation for the load, the forced electric leakage protection is performed. Specifically, the forced leakage protection can be realized by controlling a DC contactor between the battery stacks of the flow battery system to be switched off, thereby realizing forced electric leakage protection after the discharge by power off of the flow battery system fails. In addition, when the discharge stop condition is reached, the operation of controlling the discharge stop can also be completed by controlling the DC contactor between the battery stacks of the flow battery system to be switched off, thereby achieving further protection.

The present disclosure further provides a flow battery. The flow battery includes the flow battery control system of any one of the preceding embodiments. Any combination of the above embodiments is encompassed within the scope of the present disclosure.

The above description refers only to preferred embodiments of the present disclosure, but the protection scope of protection of the present disclosure is not limited thereto. Any equivalents or modifications of the technical solutions and the inventive concepts of the present disclosure made by those skilled in the art within the technical range of the present disclosure are intended to be included within the protection scope of the present disclosure.

The invention claimed is:

1. A flow battery control system, comprising:
a first acquisition unit configured to acquire a current electrolyte capacity decay rate of a flow battery;
a first comparison unit connected with the first acquisition unit and configured to compare the current electrolyte capacity decay rate of the flow battery with a first preset decay rate and a second preset decay rate;
a first control unit connected with the first comparison unit, wherein, when the current electrolyte capacity decay rate of the flow battery is greater than the first preset decay rate and less than the second preset decay rate, the first control unit adjusts a liquid level of positive electrolyte and a liquid level of negative electrolyte such that a difference between the liquid level of the positive electrolyte and the liquid level of the negative electrolyte is less than a preset value, and a ratio of a total amount of vanadium in the positive electrolyte to a total amount of vanadium in the negative electrolyte is in a first preset ratio range, or a ratio of a vanadium ion concentration in the positive electrolyte to a vanadium ion concentration in the negative electrolyte is in a second preset ratio range,
a first monitoring unit configured to monitor an operating state parameter of the flow battery, wherein the first acquisition unit is connected to the first monitoring unit and configured to acquire the current electrolyte capacity decay rate of the flow battery according to the monitored operating state parameter of the flow battery and in combination with a corresponding relationship between the operating state parameter of the flow battery and the electrolyte capacity decay rate;
a second monitoring unit configured to detect an electrolyte temperature;

a third monitoring unit configured to detect SOC of the flow battery;
a fourth acquisition unit configured to acquire a current charge power or discharge power of the flow battery;
a first determination unit, which is connected with the second monitoring unit, the third monitoring unit, the fourth acquisition unit, and the first acquisition unit, wherein the first determination unit is configured to determine an electrolyte temperature range in which the current electrolyte temperature of the flow battery resides, an SOC range in which the current SOC reside, a charge power range in which the current charge power resides or a discharge power range in which the current discharge power resides, and a capacity decay rate range in which the current electrolyte capacity decay rate resides;
a third processing unit connected with the first determination unit and configured to obtain an optimal electrolyte flow rate parameter according to the determined electrolyte temperature range, SOC range, charge power range or discharge power range, and capacity decay rate range, and in combination with a corresponding relationship among the electrolyte temperature range, the SOC range, the charge power range, the capacity decay rate range and an optimal electrolyte flow rate, or in combination with a corresponding relationship among the electrolyte temperature range, the SOC range, the discharge power range, the capacity decay rate range and the optimal electrolyte flow rate; and
a second control unit connected with the third processing unit and configured to adjust the current electrolyte flow rate of the flow battery to obtain the optimal electrolyte flow rate.

2. The flow battery control system according to claim 1, when the current electrolyte capacity decay rate of the flow battery is greater than or equal to the second preset decay rate, a capacity recovery agent is added to a positive electrolyte storage tank and a negative electrolyte storage tank.

3. The flow battery control system according to claim 2, wherein the capacity recovery agent is at least one of CxHyOz organic molecules containing at least one hydroxyl group, wherein $1 \leq x \leq 12$, $2 \leq y \leq 12$, and $1 \leq z \leq 12$.

4. The flow battery control system according to claim 2, further comprising a first calculation unit connected with the first acquisition unit and configured to calculate a use amount of the capacity recovery agent required to be added according to the current electrolyte capacity decay rate of the flow battery obtained by the first acquisition unit, a current volume of the positive electrolyte, and a negative electrolyte of the flow battery.

5. The flow battery control system according to claim 1, further comprising:
a third monitoring unit configured to detect a SOC of the flow battery; and
a second processing unit connected with the third monitoring unit and configured to obtain a maximum chargeable power value of the flow battery or a maximum dischargeable power value of the flow battery under the current SOC according to the detected SOC of the flow battery and in combination with a corresponding relationship among the SOC of the flow battery, the maximum chargeable power value of the flow battery, and the maximum dischargeable power value of the flow battery.

6. The flow battery control system according to claim 1, further comprising:
- an energy storage inverter and a battery management system which are connected with the flow battery, wherein the flow battery and the energy storage inverter form an energy storage system;
- the battery management system is connected with the energy storage inverter; the battery management system acquires operating data of the energy storage inverter directly and controls an operating state of the energy storage inverter;
- an energy storage power station monitoring system or an energy management system connected with the battery management system, wherein the battery management system uploads the operating data of the energy storage inverter and the operating parameters of the flow battery to the energy storage power station monitoring system or the energy management system, and receives an electric energy scheduling instruction for the energy storage system from the energy storage power station monitoring system or the energy management system; and
- a distributed I/O site disposed in the flow battery on site, wherein the battery management system collects the operating parameters of the flow battery through the distributed I/O site.

7. The flow battery control system according to claim 6, wherein the battery management system adjusts an operating state of the energy storage inverter according to the acquired operating parameter of the flow battery; when the operating parameter of the flow battery is abnormal, the battery management system controls the energy storage inverter to stop operating; the operating parameter of the flow battery at least includes a voltage of the flow battery; when the voltage of the flow battery is higher than a first voltage limit value or lower than a second voltage limit value, the battery management system controls the energy storage inverter to change an operating mode from a constant power mode to a constant voltage mode.

8. The flow battery control system according to claim 1, further comprising:
- a battery management system connected with the flow battery and configured to acquire a current maximum chargeable power value or maximum dischargeable power value of the flow battery in real time, and upload the acquired maximum chargeable power value or maximum dischargeable power value to an energy storage power station monitoring system or an energy management system,
- wherein the energy storage power station monitoring system or the energy management system connected with the battery management system is configured to issue an electric energy scheduling instruction to the battery management system; and
- a second comparison unit connected with the energy storage power station monitoring system or the energy management system and the battery management system and configured to compare a scheduling power value included in the electric energy scheduling instruction with the maximum chargeable power value or the maximum dischargeable power value before the energy storage power station monitoring system or the energy management system issues the electric energy scheduling instruction, wherein the energy storage power station monitoring system or the energy management system issues the electric energy scheduling instruction directly to the battery management system when the maximum chargeable power value or the maximum dischargeable power value is greater than the scheduling power value; the energy storage power station monitoring system or the energy management system adjusts the scheduling power value included in the electric energy scheduling instruction to be equal to the maximum chargeable power value or the maximum dischargeable power value when the maximum chargeable power value or the maximum dischargeable power value is less than or equal to the scheduling power value, and then issues the electric energy scheduling instruction to the battery management system.

9. The flow battery control system according to claim 1, wherein the flow battery comprises a flow battery body, and a battery assistance device and a battery management system which are connected with the flow battery body; the flow battery body is connected with a DC side of an energy storage inverter; an energy storage inverter controller is connected to the energy storage inverter; the energy storage inverter is connected with an AC bus; a UPS is also connected to an AC side of the energy storage inverter; an output end of the UPS is connected with the battery management system and the battery assistance device, wherein the control system further comprises:
- a first determination unit configured to determine whether a power grid supplies electric power normally; when the power grid is not able to supply electric power normally, the UPS, serving as a starting power source of the flow battery body, outputs electric energy to supply electric power to the battery assistance device, the battery management system and the energy storage inverter; and
- a second determination unit configured to determine whether a voltage of the flow battery body satisfies a minimum operating voltage of the energy storage inverter after the UPS serves as the starting power source of the flow battery body; when the voltage of the flow battery body satisfies the minimum operating voltage of the energy storage inverter, the energy storage inverter controller controls the energy storage inverter to enter a V/F control mode, wherein the energy storage inverter adjusts an output voltage so that a voltage of the AC bus satisfies specified electric energy quality requirements, and the UPS enters a bypass mode; when the power grid is able to supply electric power normally and after the flow battery is powered off, the energy storage inverter controller controls the energy storage inverter to release the remaining electric energy in the flow battery body to the UPS.

10. The flow battery control system according to claim 1, further comprising:
- a fourth processing unit connected with the first determination unit and configured to obtain a parameter of an optimal difference between volumes of positive electrolyte and negative electrolyte according to the determined electrolyte temperature range, SOC range, charge power range or discharge power range and capacity decay rate range, and in combination with a corresponding relationship among the electrolyte temperature range, the SOC range, the charge power range, the capacity decay rate range and an optimal difference between volumes of the positive electrolyte and the negative electrolyte, or in combination with a corresponding relationship among the electrolyte temperature range, the SOC range, the discharge power range, the capacity decay rate range and the optimal difference between volumes of the positive electrolyte and the negative electrolyte; and a third control unit connected with the fourth processing unit and configured to adjust the current difference between the volumes of the positive electrolyte and the negative electrolyte of the flow battery to obtain the optimal difference between volumes of the positive electrolyte and the negative electrolyte.

11. The flow battery control system according to claim 1, further comprising:

a sixth determination unit configured to determine whether the flow battery is powered off;

a fifth control unit connected with the sixth determination unit and configured to control the flow battery to continue to supply electric energy to a load and/or an battery assistance device after the flow battery is powered off, wherein the load is a load which is connected when the flow battery operates normally;

after the flow battery is powered off, if the flow battery does not supply electric energy to the load and/or the battery assistance device, the fifth control unit performs a forced electric leakage protection operation on the flow battery;

a fourth monitoring unit configured to, after the flow battery is powered off, detect a discharge power of the flow battery when the flow battery continues to supply electric energy to the load and/or the battery assistance device; and a seventh determination unit connected with the fourth monitoring unit and configured to determine whether the discharge power of the flow battery reaches a discharge power threshold, wherein, when the discharge power of the flow battery reaches the discharge power threshold, the fifth control unit performs the forced electric leakage protection operation on the flow battery or the control system stops working.

* * * * *